United States Patent [19]
Handke et al.

[11] Patent Number: 5,518,089
[45] Date of Patent: May 21, 1996

[54] SHOCK ABSORBER WITH A CHECK VALVE AND A CHECK VALVE FOR A SHOCK ABSORBER

[75] Inventors: Günther Handke, Euerbach; Otto Samonil, Niederwerrn; Andreas Zietsch, Rothlein, all of Germany

[73] Assignee: Fichtel & Sachs AG, Schweinfurt, Germany

[21] Appl. No.: 235,417

[22] Filed: Apr. 29, 1994

[30] Foreign Application Priority Data

May 3, 1993 [DE] Germany .................. 43 14 519.1

[51] Int. Cl.[6] ................ F16K 31/02; B60G 13/08
[52] U.S. Cl. ............... 188/299; 188/315; 188/322.13
[58] Field of Search .................... 188/299, 315, 188/311, 312, 322.13, 318; 291/434, 527.1; 251/129.05; 137/487.5

[56] References Cited

U.S. PATENT DOCUMENTS

| | | | |
|---|---|---|---|
| 4,850,460 | 7/1989 | Knecht et al. | 188/299 |
| 4,880,086 | 11/1989 | Knecht et al. | 188/299 |
| 5,180,039 | 1/1993 | Axthammer et al. | 188/299 |
| 5,265,703 | 11/1993 | Ackermann | 188/315 X |

FOREIGN PATENT DOCUMENTS

| | | |
|---|---|---|
| 0490262 | 6/1992 | European Pat. Off. . |
| 4114305 | 6/1992 | Germany . |

*Primary Examiner*—Mark T. Le
*Assistant Examiner*—Peter M. Poon
*Attorney, Agent, or Firm*—Nils H. Ljungman & Associates

[57] ABSTRACT

A shock absorber with a check valve device and a check valve device for a shock absorber is disclosed. The check valve device located in the bypass of a shock absorber between a high-pressure segment and a low-pressure segment has a check valve which can be moved by an external control into a standby opening status, in which the actual opening can be performed as a function of the pressure prevailing in the high-pressure segment, when the pressure falls below a predetermined value. By coordinating the stroke distance of a check valve body with a magnet armature, and taking into consideration a control chamber discharge cross section, noises and fluctuations of the damping force characteristic can be eliminated even with a very soft comfort setting of the check valve device.

20 Claims, 12 Drawing Sheets

SHOCK ABSORBER WITH A CHECK VALVE AND A CHECK VALVE FOR A SHOCK ABSORBER

BACKGROUND OF THE INVENTION

1. Field of the Invention

This invention relates to a shock absorber with a check valve and a check valve for a shock absorber. The check valve, possibly even a shutoff valve or non-return valve, is between two segments of a fluid connection, which connects two fluid chambers of a shock absorber with one another, whereby the check valve device with at least one check valve which separates a high-pressure segment and a low-pressure segment and has a checking body, can be adjusted between a closed and an open position by means of an external control via a magnet armature and a magnetic winding which is protected by means of a separator plate from the check valve, whereby a first side of the check valve pressurized by the high-pressure segment can be elastically pressed against a check valve seat which is a component of a pot-shaped insert, by means of a compression spring, also that a second side of the check valve body at some distance from this first side and adjacent to a control chamber is pressurized by the fluid pressure in this chamber, also that the control chamber is connected by means of a throttle section which bypasses the check valve body, also that the control chamber is connected by means of a control chamber discharge to the low-pressure segment, whereby there is a control chamber discharge valve with a control chamber discharge valve seat in the control chamber discharge, whereby the control chamber valve seat is configured on a supplemental discharge valve body, which together with a supplemental discharge valve seat on the check valve body forms a supplemental control chamber discharge of the control chamber, and that between the control chamber discharge valve body and the supplemental discharge valve body there is a coil compression spring which applies a prestress to the control chamber discharge valve body in the direction of lifting it from the control chamber discharge valve seat of the supplemental discharge valve body.

2. Background Information

Federal Republic of Germany Laid-Open Patent Application No. 41 14 305 discloses a check valve which, even after the magnet armature has been moved into the open position, only essentially switches from a hard damping force setting to a soft damping force setting when the pressure in the high-pressure section falls below a specified value. During tests on vehicles which have a particularly soft damping characteristic, unpleasant noises occurred which were caused by an unacceptable fluctuation of the damping force characteristic. In spite of the open position of the magnet armature, isolated damping force peaks were measured in the force-velocity diagram of a shock absorber equipped with such a check valve device.

OBJECT OF THE INVENTION

The object of the present invention is to eliminate the clicks and noises and the fluctuations of the damping force setting or damping force peaks of the check valve component which may occur when a particularly comfortable damping force has been set.

SUMMARY OF THE INVENTION

The invention teaches that this object can be achieved wherein the maximum magnet armature stroke length is greater than the maximum check body lifting stroke length, so that when there is a maximum magnet armature lifting stroke, the supplemental control chamber discharge between the control chamber discharge valve body and the supplemental discharge valve body is completely open.

As a result of the controlled coordination of the stroke lengths, the check valve body can open wide enough for the soft characteristic to be safely maintained. The damping force peaks which were previously detected can be eliminated, since the control chamber discharge is essentially completely opened, and thus the magnet armature also remains pressure-equalized. If the control chamber discharge is interrupted, even for only a brief period, for example by the sudden raising of the check valve device against the soft compression spring on account of the hydraulic forces in the high-pressure section, the magnet armature is essentially no longer hydraulically equalized and the magnet armature pushes the check valve body onto the check valve seat at high velocity.

To restrict the damping force characteristic tolerances, the invention teaches that the control chamber discharge preferably has a cross section which is sized so that an unthrottled discharge from the control chamber is allowed. As a result of this advantageous measure, the damping force characteristic is then determined essentially only by the compression spring and the lifting stroke length of the check valve body.

In one variant of the invention, a stop ring inside the check valve device can limit the check body stroke length. The stop ring represents a simple and economical part. Simultaneously, the ring wall of the check valve body can preferably be reduced or can be eliminated altogether, so that the part can be more easily manufactured using sintering technology.

Preferably, the stop ring is advantageously designed as a thrust collar. Thus, the geometry of the pot-shaped insert can preferably be simplified in the vicinity of the seal with the separator plate. In an alternative embodiment, the check valve body can have a ring wall, the height of which is preferably designed so that, when the ring wall reaches the maximum check valve body position, it comes in contact with the separator plate. This solution to the problem has the advantage that essentially no additional parts are required, and thus the influence of the individual tolerances is reduced.

In an additional advantageous variant, a compression spring can be used, the spring range of which is preferably smaller than the stroke length of the magnet armature.

In summary, one aspect of the invention resides broadly in a shock absorber comprising: a cylinder defining a chamber therein, said cylinder containing a damping fluid; a piston rod sealingly projecting into said cylinder and being axially displaceable with respect to said cylinder; a piston being attached to said piston rod, said piston being slidably disposed within said cylinder to sealingly divide said chamber into first and second chambers; means for permitting fluid communication between said first and second chambers; said means for permitting fluid communication comprising check valve means, said check valve means having first aperture means and second aperture means, said check valve means being configured for transmitting fluid between said first aperture means and said second aperture means; said check valve means comprising: an element comprising a first body portion and a second body portion; spring means for biasing said first body portion and said second body portion apart from one another; a seat; said element being selectively disposable against said seat; means for permitting displacement of said element away from said seat to promote fluid communication between said first aperture means and said second aperture means; said means for permitting displacement of said element away from said seat comprising: armature means; and electromagnetic means for activating said armature means to permit displacement of said element away from said seat; said means for permitting displacement of said element away from said seat permitting said first body portion and said second body portion to move with respect to one another upon action of said biasing means; means for maintaining separation of at least a portion of said first body portion and at least a portion of said second body portion from one another, upon displacement of said element away from said seat; said means for maintaining separation comprising: a first mechanical stop for limiting the displacement of said first body portion, upon displacement of said element away from said seat, to a first maximum displacement; a second mechanical stop for limiting the displacement of said second body portion, upon displacement of said element away from said seat, to a second maximum displacement; and said first and second mechanical stops being configured such that said first maximum displacement is greater than said second maximum displacement.

Another aspect of the invention resides broadly in a shock absorber comprising: a cylinder defining a chamber therein, said cylinder containing a damping fluid; a piston rod sealingly projecting into said cylinder and being axially displaceable with respect to said cylinder; a piston being attached to said piston rod, said piston being slidably disposed within said cylinder to sealingly divide said chamber into first and second chambers; means for permitting fluid communication between said first and second chambers; said means for permitting fluid communication comprising check valve means, said check valve means having first aperture means and second aperture means, said check valve means being configured for transmitting fluid between said first aperture means and said second aperture means; said check valve means comprising: an element comprising a first body portion and a second body portion; means for biasing said first body portion and said second body portion apart from one another; a seat; said element being selectively disposable against said seat; means for permitting displacement of said element away from said seat to promote fluid communication between said first aperture means and said second aperture means; and said means for permitting displacement of said element away from said seat permitting said first body portion and said second body portion to move with respect to one another upon action of said biasing means; and means for maintaining separation of at least a portion of said first body portion and at least a portion of said second body portion from one another, upon displacement of said element away from said seat.

Yet another aspect of the invention comprises, in a shock absorber, which shock absorber comprises: a cylinder defining a chamber therein, the cylinder containing a damping fluid; a piston rod sealingly projecting into the cylinder and being axially displaceable with respect to the cylinder; a piston being attached to the piston rod, the piston being slidably disposed within the cylinder to sealingly divide the chamber into first and second chambers, a check valve comprising means for permitting fluid communication between the first and second chambers; said check valve having first aperture means and second aperture means, said check valve being configured for transmitting fluid between the first aperture means and the second aperture means; said check valve further comprising: an element comprising a first body portion and a second body portion; spring means for biasing said first body portion and said second body portion apart from one another; a seat; said element being selectively disposable against said seat; means for permitting displacement of said element away from said seat to promote fluid communication between said first aperture means and said second aperture means; said means for permitting displacement of said element away from said seat comprising: armature means; and electromagnetic means for activating said armature means to permit displacement of said element away from said seat; said means for permitting displacement of said element away from said seat permitting said first body portion and said second body portion to move with respect to one another upon action of said biasing means; means for maintaining separation of at least a portion of said first body portion and at least a portion of said second body portion from one another, upon displacement of said element away from said seat; said means for maintaining separation comprising: a first mechanical stop for limiting the displacement of said first body portion, upon displacement of said element away from said seat, to a first maximum displacement; a second mechanical stop for limiting the displacement of said second body portion, upon displacement of said element away from said seat, to a second maximum displacement; and said first and second mechanical stops being configured such that said first maximum displacement is greater than said second maximum displacement.

BRIEF DESCRIPTION OF THE DRAWINGS

This invention is explained in greater detail below, with reference to the accompanying figures, wherein.

DESCRIPTION OF THE PREFERRED EMBODIMENT

Figure 1:
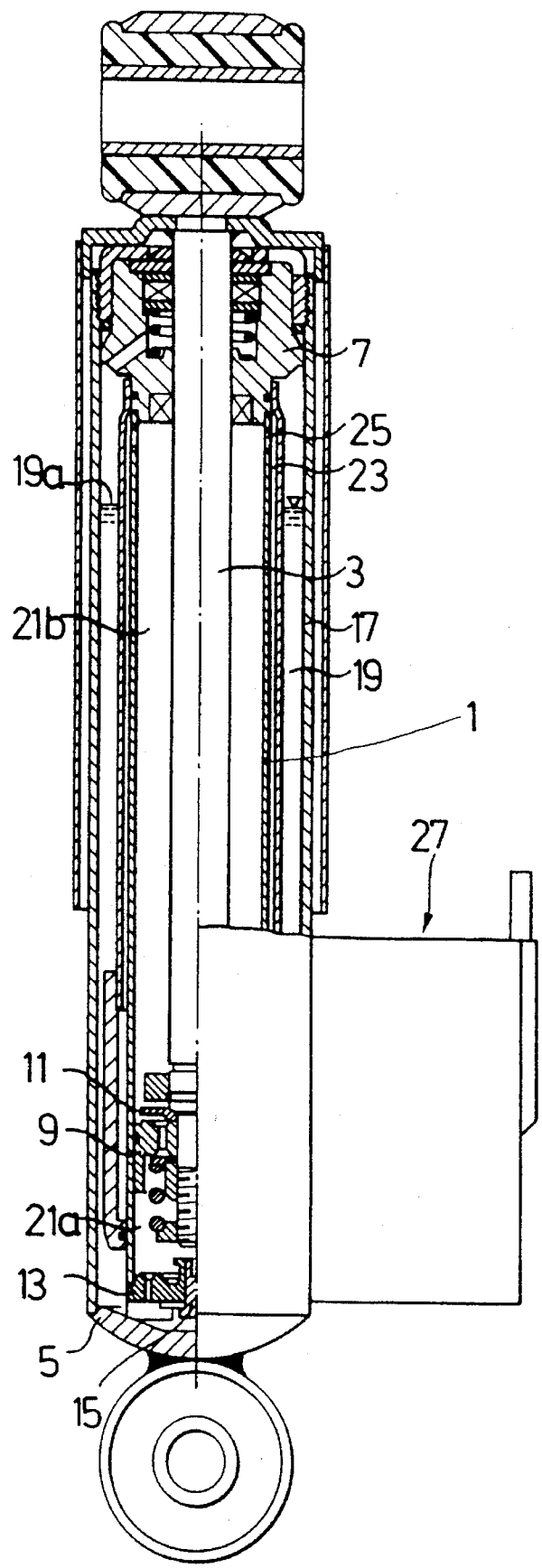
FIG. 1 shows a shock absorber with a bypass and a check valve in the bypass.

In FIG. 1, the cylinder of a shock absorber is designated 1, and the piston rod is designated 3. On the bottom, the cylinder is closed by a base 5. The piston rod 3 preferably extends out of the upper end of the cylinder by means of a guide and sealing unit 7. Inside the cylinder 1, a piston unit 9 with a plunger valve system 11 is preferably fastened to the piston rod 3. The lower end of the cylinder 1 is preferably closed by means of a base plate 13 with a base valve system 15. The cylinder 1 is preferably enclosed by a container tube 17. Between the container tube 17 and the cylinder 1, a toroidal space 19 is preferably formed, which preferably represents an equalization chamber. The space inside the cylinder 1 is preferably divided by the piston unit 9 into a first work chamber 21a and a second work chamber 21b. The work chambers 21a and 21b are preferably filled with hydraulic fluid. The equalization chamber 19 is preferably filled up to the level 19a with fluid, and above that with gas. Inside the equalization chamber 19, there is preferably a first segment of a line or conduit, namely a high-pressure line segment 23, which is preferably connected by means of a hole 25 in the cylinder 1 to the second work chamber 21b. Connected to this high-pressure segment there is preferably a check valve device 27 connected laterally to the container tube 17. From the check valve 27, a second line segment (not shown), namely a low-pressure line segment, preferably leads to the equalization chamber 19.

When the piston rod 3 is extended upward out of the cylinder 1, the upper work chamber 21b essentially becomes smaller. An overpressure can accumulate in the upper work chamber 21b, which can preferably be relieved by the piston valve system 11 into the lower work chamber 21a, as long as the check valve device 27 is closed. Preferably, when the check valve device 27 is opened, fluid simultaneously flows from the upper work chamber 21b through the high-pressure line 23 and the check valve 27 into the equalization chamber 19. The damping characteristic of the shock absorber during the extension of the piston rod 3 can therefore essentially be a function of whether the check valve 27 is open or closed.

When the piston rod 3 is retracted into the cylinder 1, i.e. downwardly, an overpressure can accumulate in the lower work chamber 21a. Liquid can then preferably flow from the lower work chamber 21a through the plunger valve system 11 upward into the upper work chamber 21b. The fluid displaced by the increasing piston rod volume inside the cylinder 1 is preferably expelled by the base valve 15 into the equalization chamber 19. An increasing pressure can also accumulate in the upper work chamber 21b, since the flow resistance of the plunger valve system 11 is essentially less than the flow resistance of the base valve 15. When the check valve 27 is open, this increasing pressure can flow through the high-pressure line segment 23 into the equalization chamber 19. That means that when the check valve device 27 is open, the shock absorber essentially has a softer characteristic even during retraction. Also, the shock absorber essentially has a harder characteristic when the check valve device is closed, just as during the extension of the piston rod. It should be noted that, in at least one preferred embodiment of the present invention, the direction of flow through the high-pressure segment 23 of the bypass is essentially always the same, regardless of whether the piston rod is moving in or out.

Figure 2:
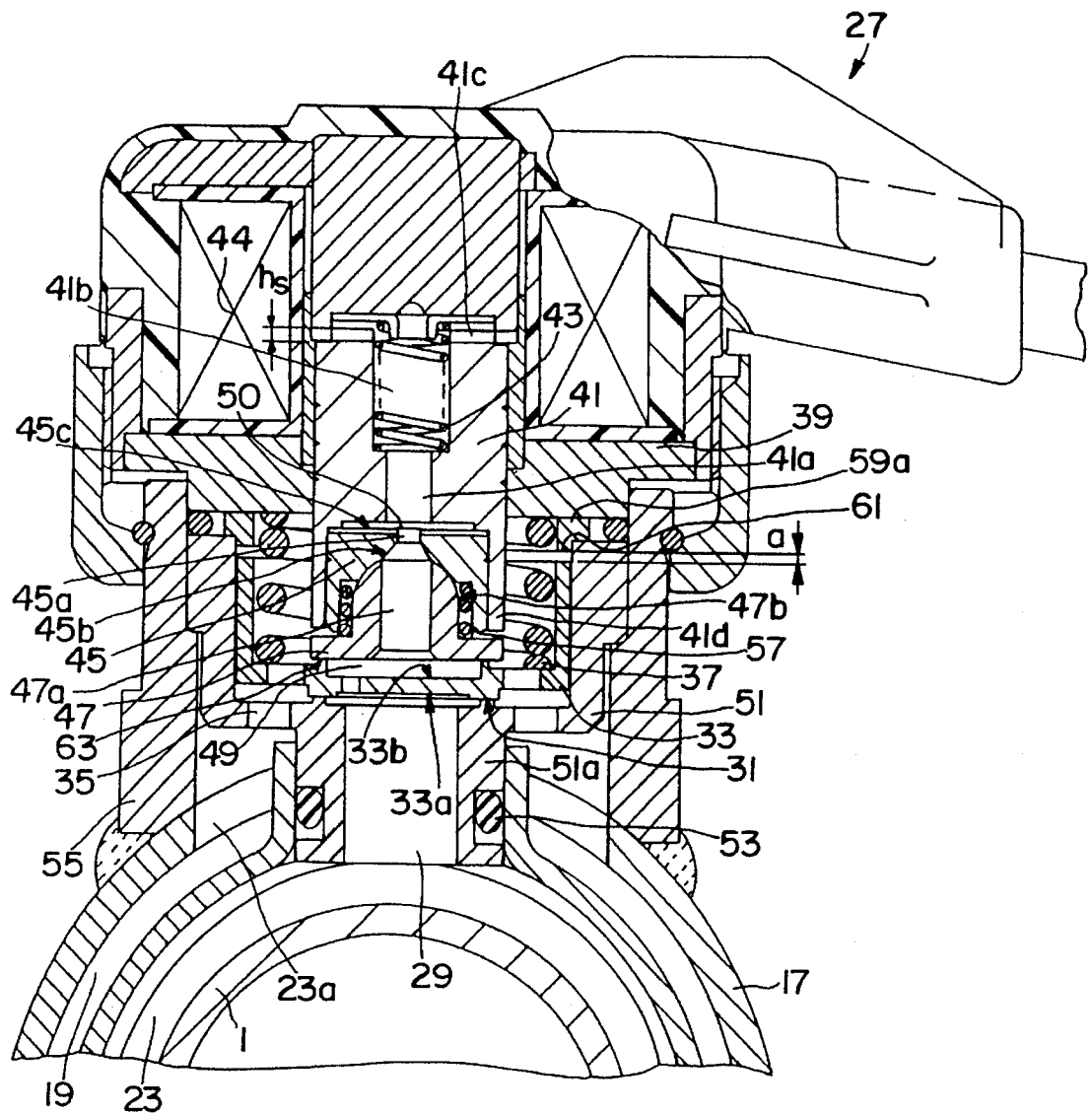
FIGS. 2–4 show embodiments of the check valve according to the present invention.

FIG. 2 represents a cross section of the cylinder 1, and shows the high-pressure segment 23 of the bypass and the equalization chamber 19. Preferably, connected to the high-pressure segment 23 there is a central channel 29 belonging to the check valve device 27. In the upper end of the central channel 29, there is preferably a check valve seat 31. A rigid check valve plate 33 preferably lies on the check valve seat 31 in the manner of a check valve body. In FIG. 2, the check valve plate is shown in its checking position. Also, in FIG. 2, the connection between the central channel 29 and the equalization chamber 19 via holes 35 is essentially closed. The check valve plate 33 is preferably prestressed by a coil compression spring 37 in the direction of the check valve seat 31, wherein coil compression spring 37 is preferably supported on a separator plate 39.

In the check valve device 27, a magnet armature 41 is preferably oriented concentric to the central channel 29. This magnet armature 41 is preferably prestressed downward by a magnet armature prestress spring 43, and can preferably be pulled upward by means of a magnet winding 44, when this magnet winding 44 is charged with current. Such magnetic windings, and their operation in conjunction with a valve, are generally well-known to those of ordinary skill in the art, and will not be discussed in further detail here.

Between the magnet armature and the check valve plate 33, there is preferably an intermediate body component 45, 47. The intermediate body component 45, 47 preferably comprises a control chamber discharge valve body 45 and a supplemental discharge valve body 47.

A hole 41a in the magnet armature 41 preferably connects a spring chamber 41, which houses the magnet armature prestress spring 43, to the chamber 49 formed between the supplemental discharge valve body 47 and the check valve plate 33. A control chamber 50 is preferably formed collectively by: a hole 47a in the supplemental discharge valve body 47; hole 45a in the control chamber discharge valve body 45; hole 41a in the magnet armature 41; the spring chamber 41b; and chamber 41c located above the magnet armature.

The underside of the check valve plate 33 is designated 33a, and the upper side is designated 33b. As illustrated, the check valve plate 33 is preferably exposed on the bottom to the pressure P in the central channel 29, i.e. to the pressure in the upper work chamber 21 (see FIG. 1) and the high-pressure segment 23.

The check valve plate 33 is preferably installed in a pot-shaped, or cup-shaped, insert 51, which insert preferably has a hole 35 and a pipe socket 51a on the bottom. This pipe socket 51a preferably forms the central passage 29 and is preferably connected in a sealed manner by a gasket 53 to the first segment 23 of the bypass. The pot 51 is preferably inserted in a pipe socket 51a which is welded to the container 17. The space between the pot 51 and the pipe socket 51a preferably forms a low-pressure segment 23a of the bypass. The high-pressure segment 23 and the low-pressure segment 23a together preferably form the bypass. Preferably, placed on the pot 51 is the separator plate 39, which can form a single component, together with the iron parts and housing parts belonging to the magnet winding 44.

When the magnet winding 44 is not carrying a current, the control chamber discharge valve body 45 preferably lies in the illustrated check position with its cone 45b on a ring zone 47b of the supplemental discharge valve body 47 forming the control chamber discharge valve seat. A coil compression spring 57 preferably pushes the control chamber discharge valve body 45 in the direction of lifting off the control chamber discharge seat 47b. The control chamber discharge valve body 45 is preferably guided in a sealed manner in a tubular extension 41d of the magnet armature 41. As a result of the supplemental closing force generated by the magnet armature prestress spring 43, the magnet armature 41 essentially lies in the illustrated checking position of the control chamber discharge valve 45, 47b on the control chamber discharge valve body 45, and holds the control chamber discharge valve body 45 against the force of the spring 57 in its checking position. The pressure prevailing in the control chamber 50 is essentially forwarded via the passages formed in the magnet armature 41 to the entire back side 45c of the control chamber discharge valve body 45. Since the control chamber discharge valve body 45 offers a larger pressurization surface 45c to the pressure P in the control chamber 50 than does the supplemental discharge valve body 47 in the vicinity of the chamber 49, the pressure P in the control chamber 50 essentially exerts a hydraulic closing force directed downward on the intermediate body component 45, 47. In this position, the maximum stroke length hs is available for the magnet armature 41. Likewise, the distance a is the greatest between the check valve body 33 and a thrust collar 59a, which forms a stop by means of its end surface 61.

If the magnetic winding 44 is charged with current as a result of an opening command from the external signal source, and consequently the magnet armature 41 is lifted off the control chamber discharge valve body 45, so that the magnet armature 41 has travelled the entire stroke distance hs, then the control chamber discharge valve body 45 remains in its checking position, if the pressure P prevailing in the control chamber 50 is greater than a predetermined limit value PG of the pressure, since the hydraulic closing force exerted by the pressure P on the reverse side 45c of the control chamber discharge valve body 45 is essentially greater than the opening force exerted by the spring 57 on the control chamber discharge valve body 45. If the pressure P in the control chamber 50 drops below the limit value PG as a result of a reduction of the pressure in the central passage 29, then the control chamber discharge valve body 45 is essentially lifted from the control chamber discharge valve seat 47b on account of the now-dominant spring force exerted by the spring 47. At this point, damping fluid can flow between the control chamber discharge valve body 45 and the control chamber discharge valve seat 47b to the equalization chamber 19. The pressure P acting on the rear side 45c thereby breaks down, so that the control chamber discharge valve body 45, as a result of the force of the spring 57, is lifted completely off the control chamber discharge valve seat 47 and the hole 45a is essentially completely opened. At high flow rates, as a result of the pressure drop which occurs at the hole 45a, a force directed toward the opening of a supplemental discharge valve 47, 63 is exerted on the supplemental discharge valve body 47, so that the supplemental discharge valve 47, 63 opens. The check valve 33, 31 now acts in connection with the spring 37 as a standard, spring-loaded damping valve.

During the lifting motion of the check valve body 33, the latter cannot "open" against spring 37, in spite of the sudden pressure drop in the control chamber 50, but the thrust collar 59a essentially restricts the length of the lifting stroke to the distance a. In accordance with at least one preferred embodiment of the present invention, the spring 37 may essentially be considered to be "soft". The stroke length hs of the magnet armature 41 is always preferably greater by a defined amount, so that the control chamber discharge valve 45, 47b is always opened sufficiently wide by the spring 57 such that the control chamber valve body 45 is in contact with the magnet armature 41 and the control chamber discharge of the control chamber discharge valve 45, 47b is essentially at a maximum.

The discharge of the supplemental discharge valve 47, 63 essentially does not apply any additional damping forces to the check valve 33, 31, so that a series variance of the damping force is reduced to tolerances which may essentially be considered to be customary.

Figure 3:
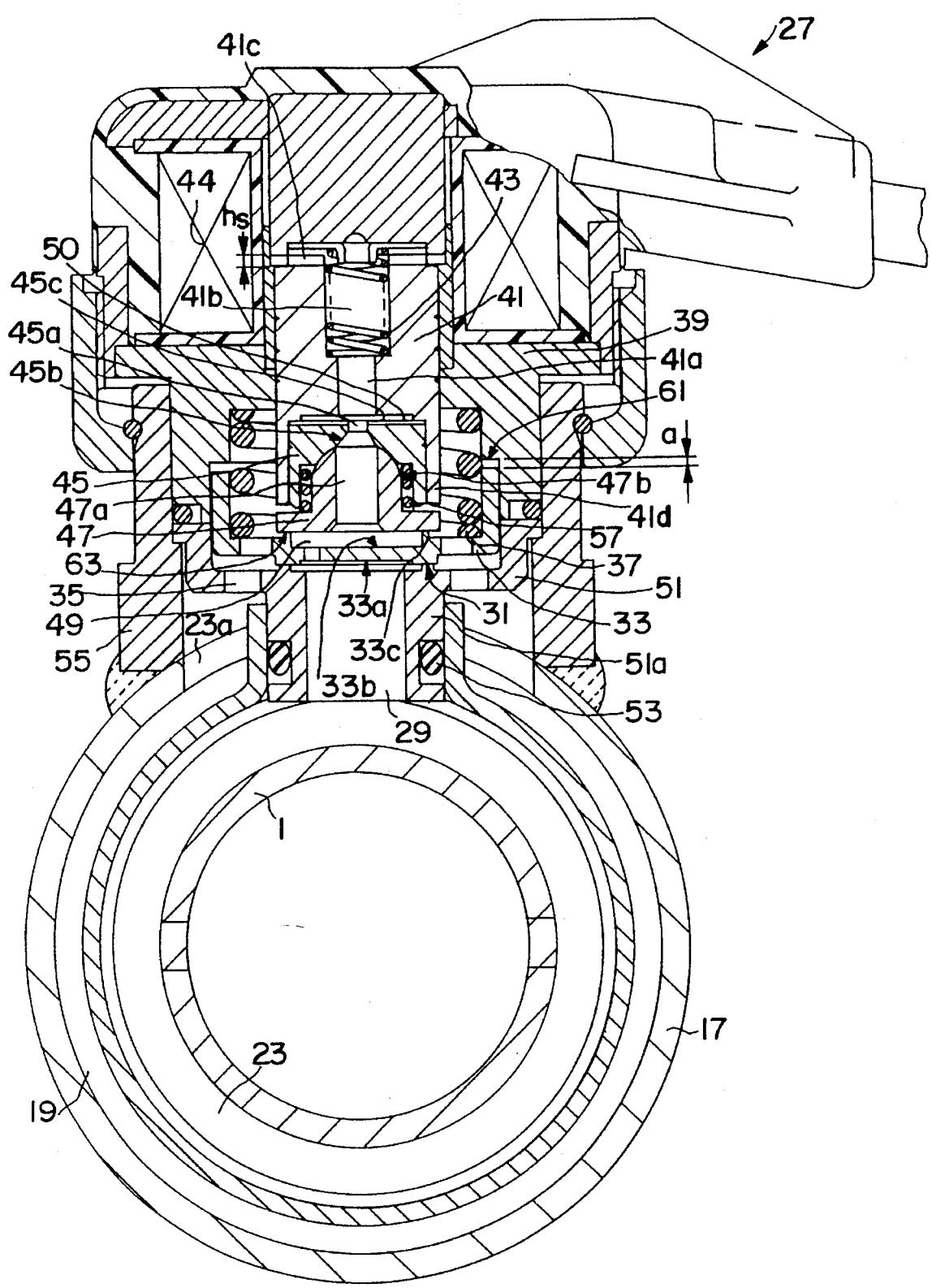

In the embodiment shown in FIG. 3, the distance a can preferably be determined by the height of the ring wall 33c of the check valve body 33 to the separator plate 39. In this configuration, the thrust collar 59a (see FIG. 2) can essentially be eliminated, and the small tolerance influence resulting from the height of the intermediate ring can essentially be eliminated.

Figure 4:
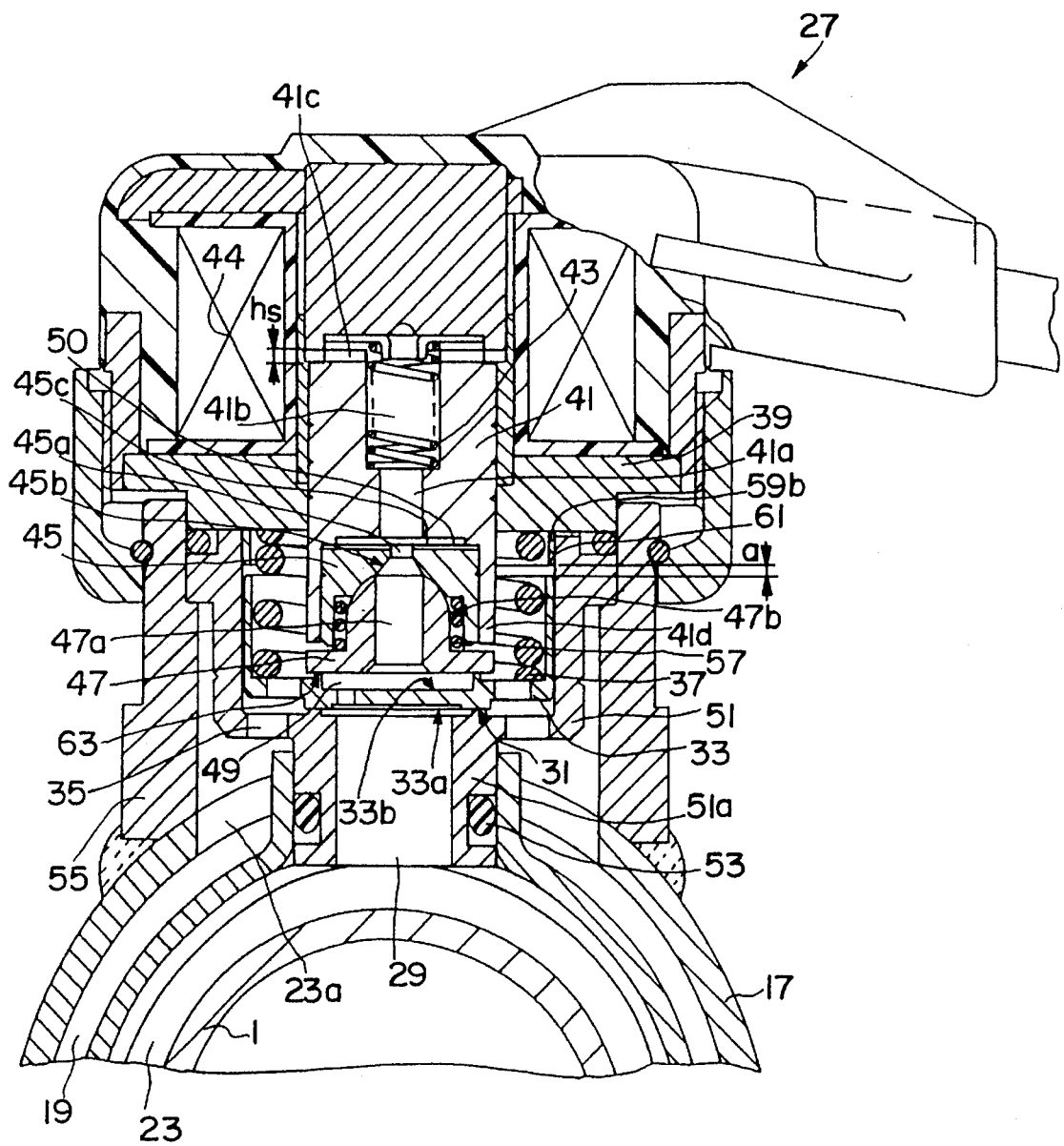

FIG. 4 shows an embodiment which has a slotted clamping ring 59b as the stop ring. The clamping ring 59b is preferably lightly pressure-fitted to the pot-shaped insert 51, and is thereby essentially fixed in place. Otherwise, the function of the clamping ring 59b is essentially the same as that of the thrust collar 59a illustrated in FIG. 2.

An additional possibility for determining distance a is to specify the block length, or conversely the range of spring travel, of the spring 37, so that the distance a is determined by the spring 37.

Figure 5:
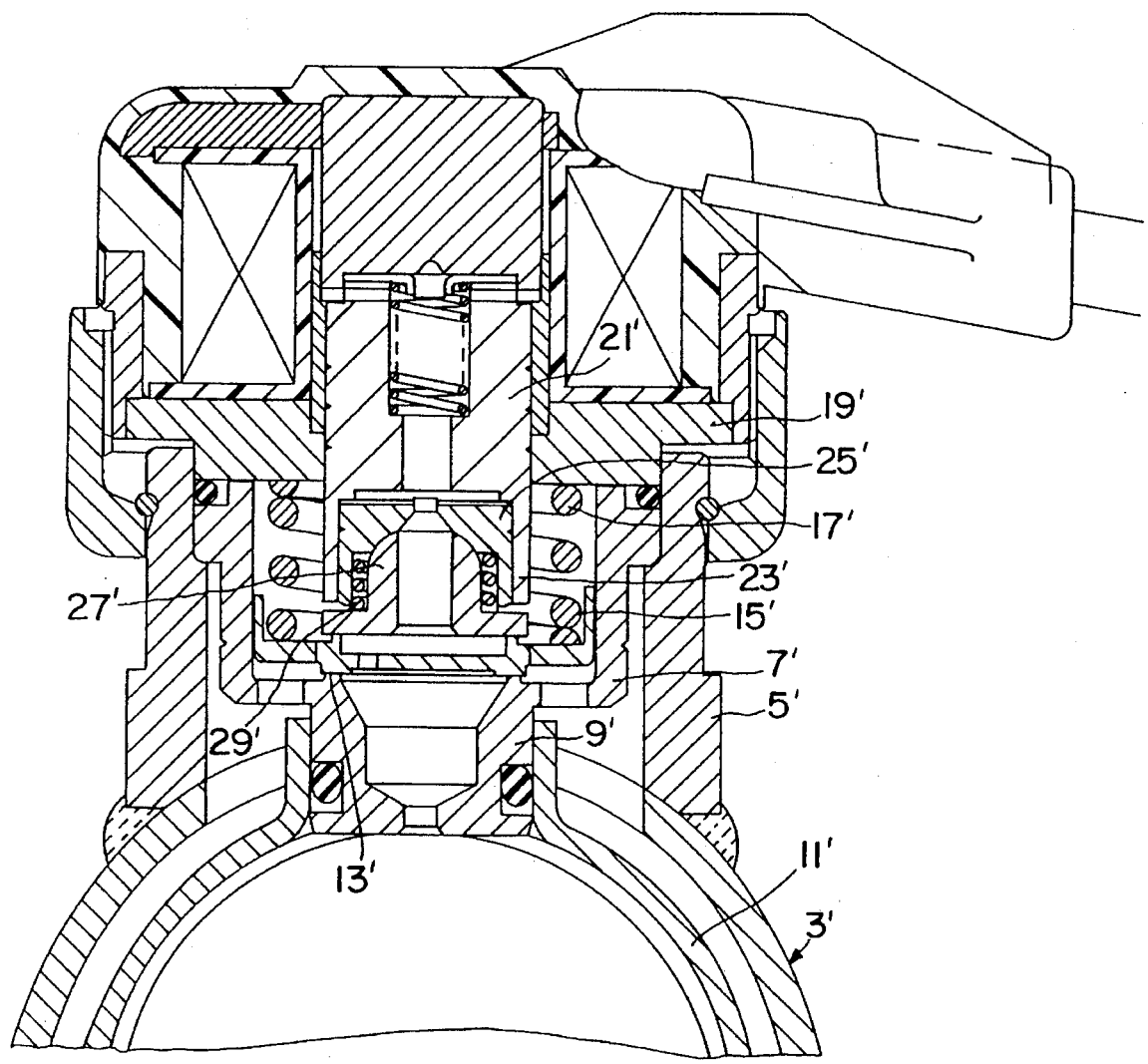
FIG. 5 shows an overall view of a check valve which may be utilized in accordance with the embodiments of the present invention.

FIG. 5 shows a check valve module 1' (see FIG. 6), the basic design and function of which are generally well-known. Preferably welded onto a container tube 3' is a pipe 5', which pipe 5' preferably holds the essential part of the valve. A pot, or cup, 7' is preferably engaged by means of its pipe sockets 9' in an adapter tube 11'. The pot 7' also preferably encloses a check valve seat 13' on which a check valve plate 15' is supported, which plate 15' is preferably prestressed by a coil spring 17', which spring 17' is preferably connected on the housing side to a plate 19'. Inside the plate 19', there is preferably a central opening for a magnet armature 21'. The magnet armature 21' can preferably have a ring flange 23' which projects downward, which holds and centers a control chamber discharge valve body 25'. The control chamber discharge valve body 25' preferably has a conical guide area, which in turn preferably guides a supplemental discharge body 27'. Between the control chamber discharge valve body 25' and the supplemental discharge body 27', there is preferably a spring 29' which prestresses the two valve parts 25' and 27' in relation to one another.

During the assembly of the check valve module 1', the shock absorber having the welded-on pipe sockets 5' is preferably equipped with the pot 7'. The valve plate 15' is preferably placed on the check valve seat 13'. Then the coil spring or springs 17' are preferably introduced. The magnet armature 21' is preferably introduced into the plate 19'. The magnet armature 21' can preferably have a completely-assembled field winding 31' (see FIG. 6), with a valve cover, on its reverse side. The control chamber discharge valve body 25' and the supplemental discharge body 27' are preferably in the ring flange 23' of the magnet armature 21'. The control chamber discharge valve body 25' and the supplemental discharge body 27' are preferably connected by means of the spring 29' and preferably form a single module. Once the plate 19' has been installed, the control chamber discharge body 25' and the supplemental discharge body 27' can essentially no longer fall apart.

Figure 6:
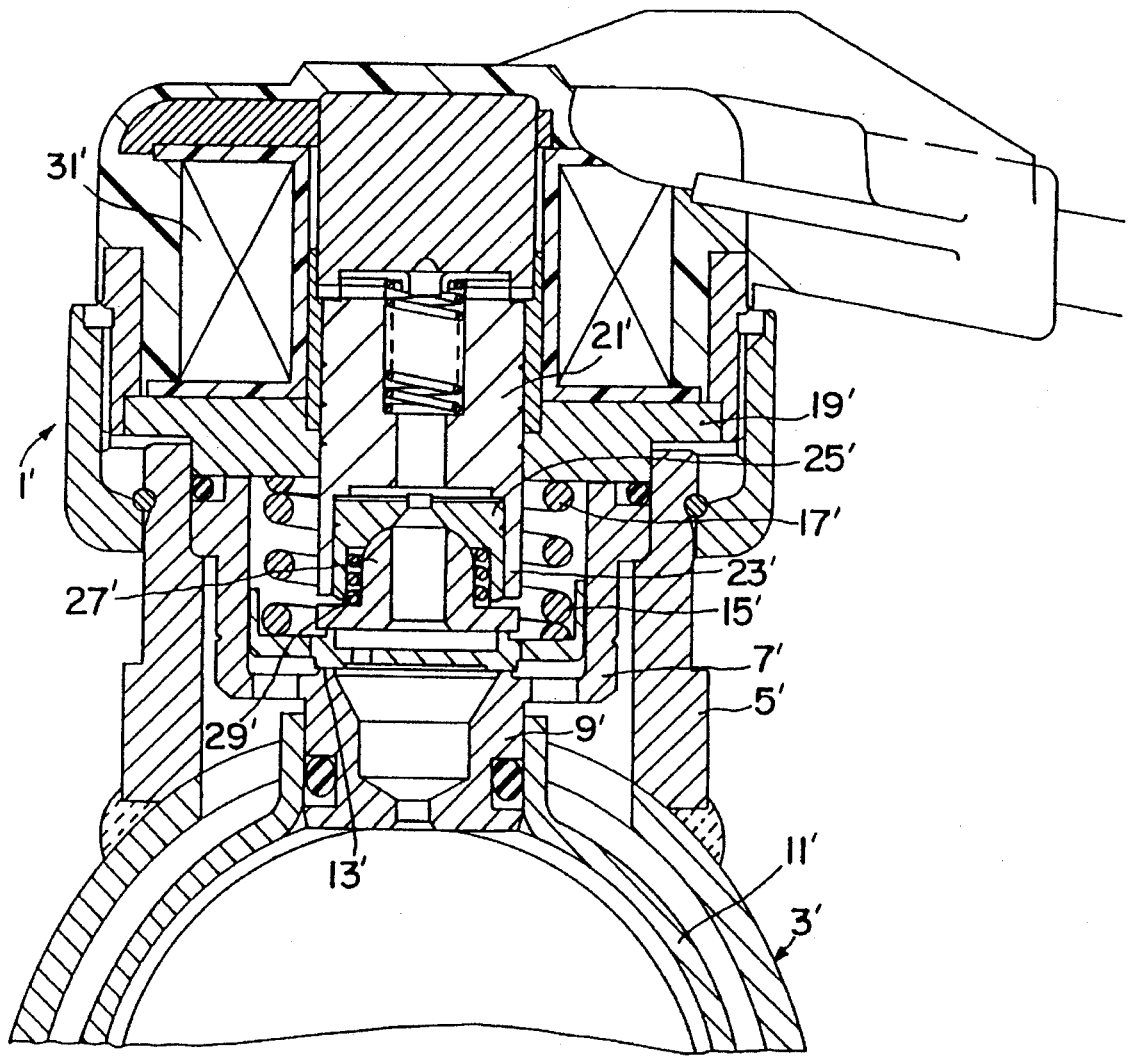
FIG. 6 is substantially the same view as FIG. 5, but more detailed.

FIG. 6 more particularly illustrates various features of a check valve according to the present invention.

Figure 7:
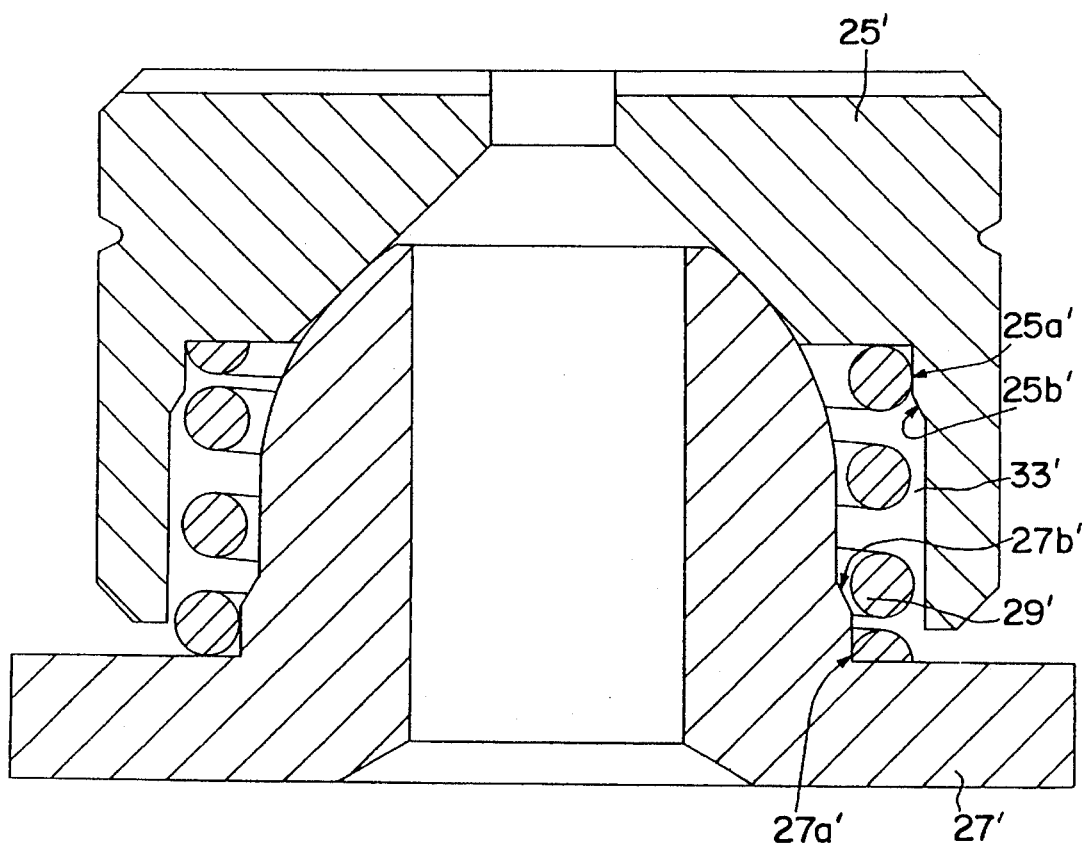
FIG. 7 shows a spring with a force fit connection.

FIG. 7 is restricted to an illustration of check valve module 11' in the area between the control chamber discharge valve body 25' and the supplemental discharge body 27', plus the spring 29'. The bodies 25'/27' are preferably connected by means of the spring 29'. This spring 29' is preferably fitted to the control chamber valve discharge body 25' at its outside diameter, and to the supplemental discharge body 27' at its inside diameter by means of a slight force fitting. Preferably, the connection is configured to be capable of absorbing axial tensile stresses which exceed the dead weight of one of the valve bodies 25'/27', so that the connection can be reliably maintained during the assembly process. The force-fitted seats 25a'/27a' of the valve bodies 25'/27' can generally very easily result from surfaces 25b'/27b', so that there can preferably be a ring-shaped gap formed between the spring 29' and the valve bodies 25'/27'. Therefore, essentially no friction will occur in the event of a relative movement between the control chamber discharge valve body 25' and the spring 29', or between the supplemental discharge body 27' and the spring 29'.

Thus, as shown in FIG. 7, in accordance with a preferred embodiment of the present invention, bodies 25' and 27' can preferably be connected by spring 29', as shown. Body 25' may generally be considered to be a generally cup-shaped receptacle for receiving a major portion of body 27'. In this respect, body 27' is preferably generally configured to protrude into the general cup shape of body 25'. The interior wall portion of body 25', that is, that wall portion of the general cup shape which faces generally towards the central axis of the check valve, preferably has a major portion, that is, the portion not constituted by seat 25a', which essentially does not come into contact with spring 29'. Surface 25b' is preferably frustoconical and preferably serves as a transition into seat 25a', wherein seat 25a', preferably a surface being parallel to the central axis of the check valve, preferably contacts a terminal coil of spring 29', at an outer diameter of the terminal coil, so as to provide a secure force-fit of that terminal coil of spring 29'.

Likewise, the exterior surface of body 27', that is, that surface facing generally away from the central axis of the check valve, preferably has a major portion, that is, that portion not constituted by seat 27a', which essentially does not come into contact with spring 29'. Surface 27b', like surface 25b', is preferably frustoconical and preferably serves as a transition into seat 27a', wherein seat 27a', preferably a surface being parallel to the central axis of the check valve, preferably contacts the other terminal coil of spring 29', at an inner diameter of the terminal coil, so as to provide a secure force-fit of that terminal coil of spring 29'.

Figure 8:
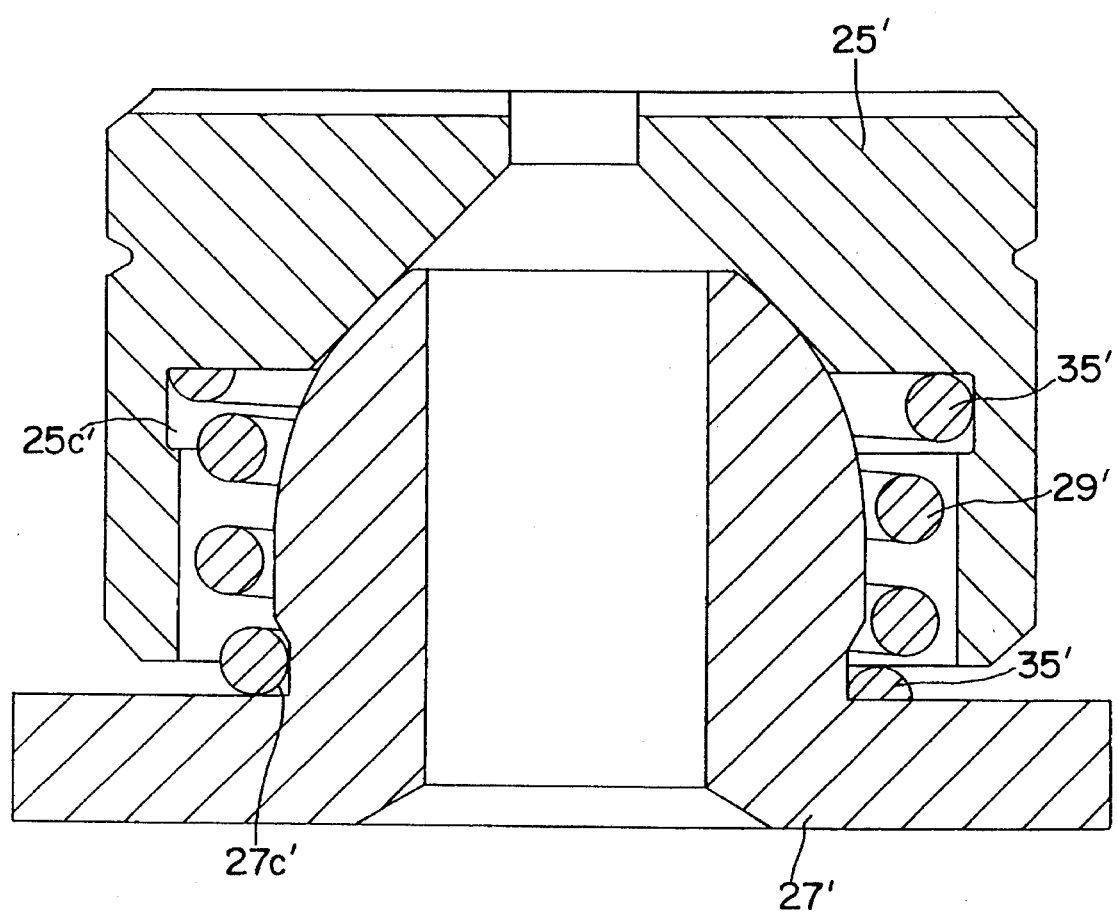
FIG. 8 shows a spring with a form fit connection.

In a variation of the arrangement illustrated in FIG. 7, the module illustrated in FIG. 8 has a form-fitted connection between the spring 29' and the control chamber discharge valve body 25' and the supplemental discharge body 27'. The form-fitted connection can preferably be achieved by means of a lock, or locking connection, between the spring 29' and the valve bodies 25'/27'. The lock can preferably be formed by the terminal coils 35' of spring 29' and corresponding locking grooves 25c'/27c'. For this type of connection, a spring 29' can preferably be used in which the terminal coils have different coil diameters.

Thus, as shown in FIG. 8, in accordance with a preferred embodiment of the present invention, the spring 29' connecting bodies 25' and 27' may preferably be form-fitted with bodies 25' and 27'. In this respect, body 25' preferably has a groove portion 25c' which is essentially constituted by a generally cylindrical area having a greater diameter than the rest of the inner wall portion of body 25'. This groove portion 25c' is thus preferably configured to accept a terminal coil 35' of spring 29' wherein such a terminal coil 35' preferably has a greater diameter than the other coils of spring 29'. Additionally, body 27' preferably has a groove portion 27c' indented into the outer surface of body 27', such a groove portion 27c' essentially being constituted by an indented cylindrical surface being parallel to the central axis of the check valve. This groove portion 27c' is thus preferably configured to accept the other terminal coil 35' of spring 29', wherein such a terminal coil 35' preferably has a smaller diameter than the other coils of spring 29'.

Figure 9:
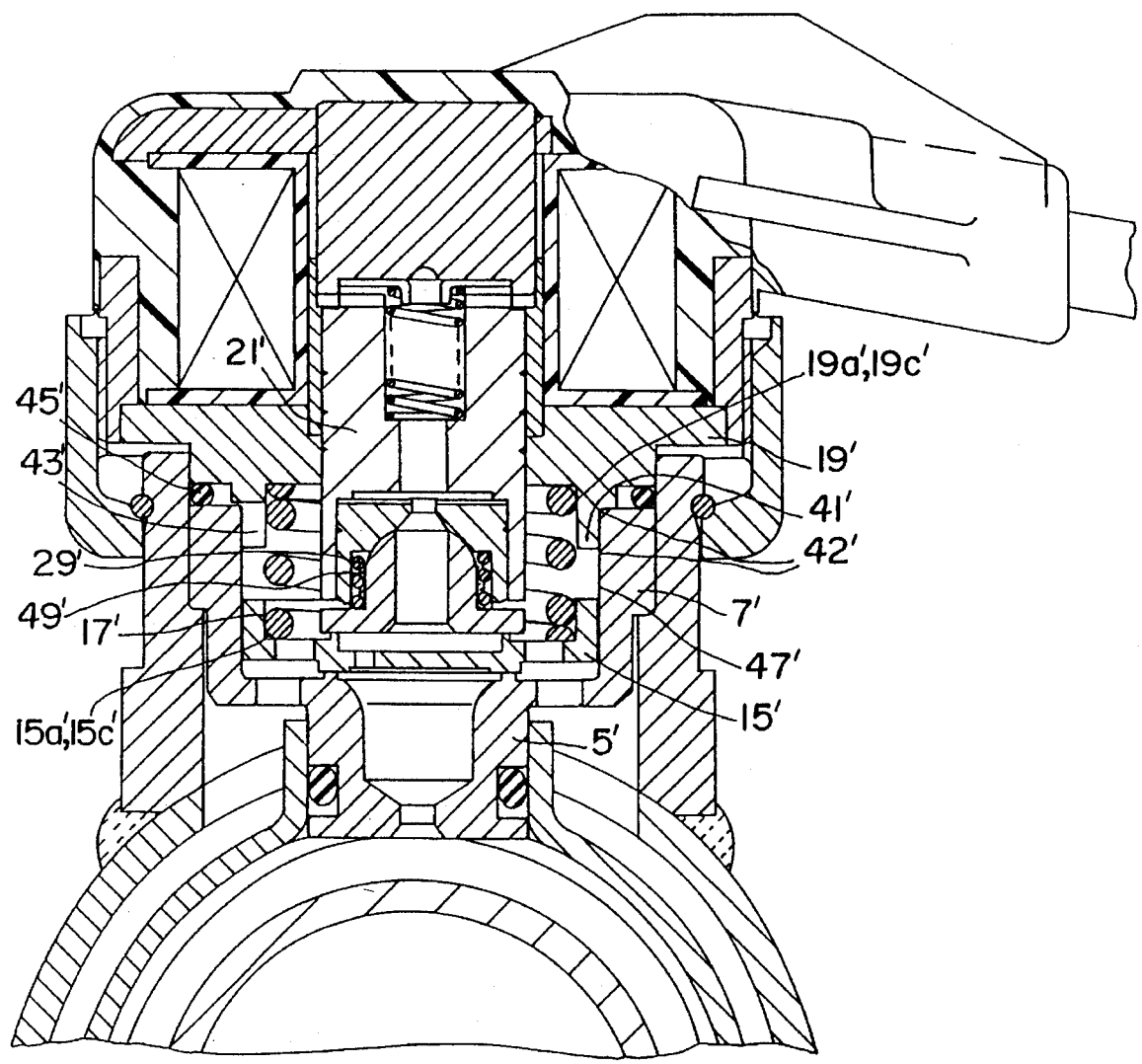
FIG. 9 shows a check valve module with a connection between pot and plate.

In the embodiment illustrated in FIG. 9, the housing-side plate 19' can preferably have a guide 41' which forms a connection with the pot 7'. The retention force of this connection 42' is preferably greater than the combined spring forces of the coil spring 17', the spring 29' and the spring 51' (see FIG. 10) for the armature 21'. The guide 41' preferably has at least one opening 43' for an O-ring, or gasket, 45' between the plate 19' and the pot 7'. The connection 42' can preferably be formed by a force fit 47', but can also preferably be formed by means of a weld 49'.

Figure 10:
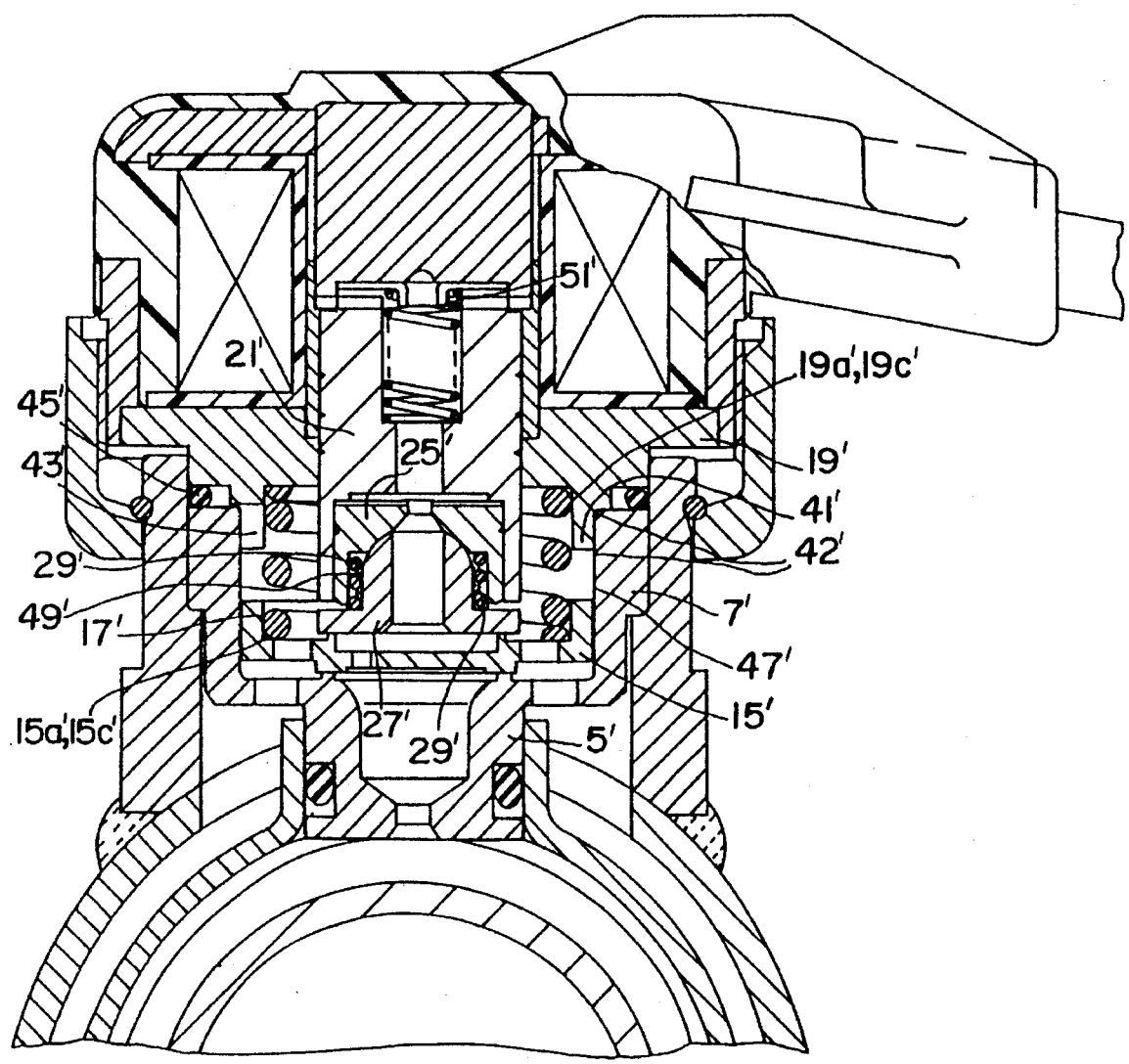
FIG. 10 is substantially the same view as FIG. 9, but more detailed.

Thus, as illustrated in FIGS. 9 and 10, in accordance with a preferred embodiment of the present invention, housing-side plate 19' can preferably have a guide 41', essentially in the form of an annular extension, which extends so as to be able to make contact, in a radial direction of the check valve, with pot 7'. This radial contact is indicated as connection 42'. Connection 42' can preferably be formed by a force fit 47', a weld 49' or, conceivably, both.

If the housing of the check valve module is turned around, the housing can preferably form an assembly jig into which the individual parts of the check valve module can be inserted. The pot 7' thus essentially "closes" the check valve module to form a separate module, which can then be very easily and reliably installed on the shock absorber, without this module falling apart.

In other words, in accordance with a preferred embodiment of the present invention, the housing of the check valve module, if turned around so as to essentially be in the form of an upward-facing receptacle, individual parts of the check valve can essentially very easily be inserted into the "receptacle". In this manner, installation of the pot 7' would essentially "close" the check valve module by essentially capping the opening of the receptacle, which would then allow easy and reliable installation on a shock absorber. Between the spring 17' and the guide 41', and between the spring 17' and the check valve plate 15', a connection can preferably be achieved among components 17', 15a', 15c', 41a', 41c', in a manner analogous to that illustrated in FIGS. 7 and 8. In other words, in accordance with a preferred embodiment of the present invention, not only is it possible for bodies 25' and 27' to have the connections 25a/c' and 27a/c' with spring 29', as shown in FIGS. 7 and 8, but it is additionally possible for check valve plate 15' and guide 41' to have similar connections, in the form of force-fit connections 15a' and 41a' or form-fit connections 15c' and 41c', with spring 17'. Thus, there may conceivably be two sets of modular assemblies, one constituted by bodies 25' and 27' with spring 29', and the other constituted by check valve plate 15' and guide 41' with spring 17'.

It will be appreciated that, if the check valve module has to be disassembled, the pot can be removed without the row of components inside the check valve module falling apart. In this respect, it will be noted that the connection 15a', 15c', 41a', 41c' essentially holds all the individual parts together by means of the check valve plate 15'.

Figure 11:
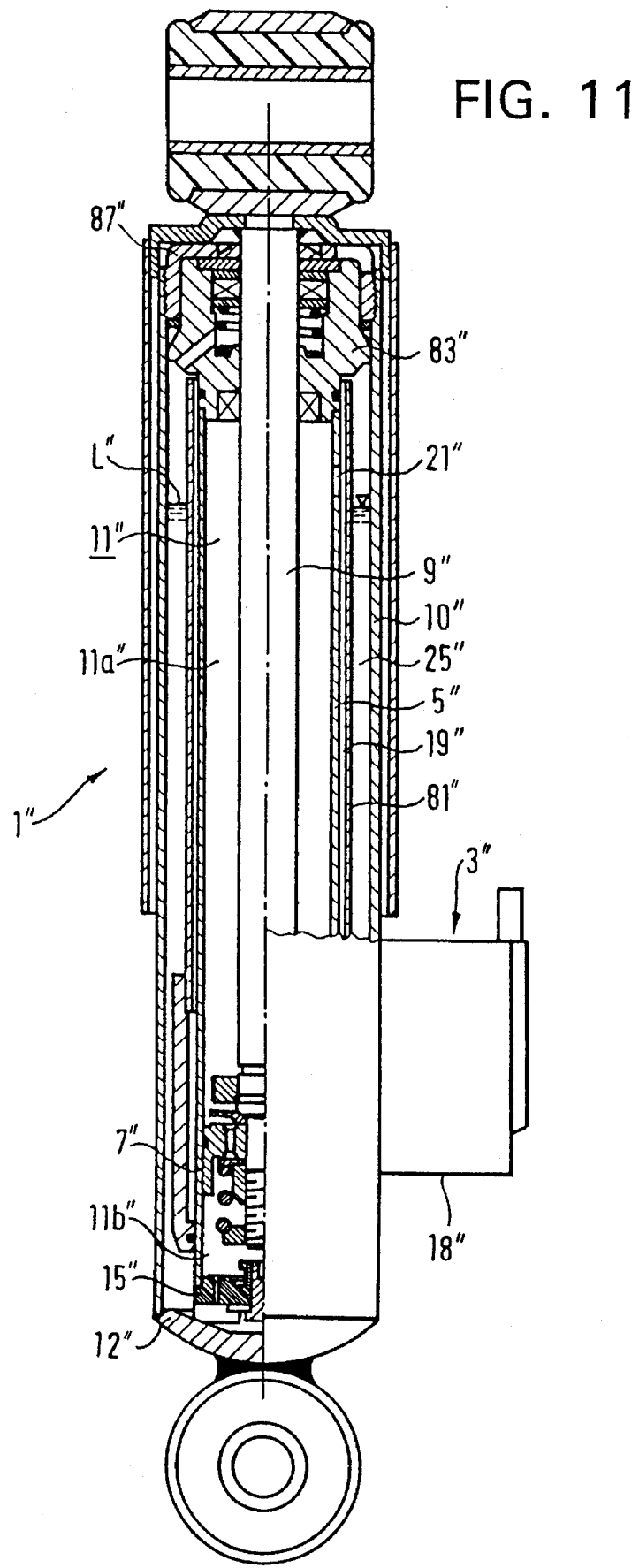
FIGS. 11 and 12 illustrate a vibration damper, and components thereof, including a check valve, which may be utilized in accordance with the embodiments of the present invention.
Figure 12:
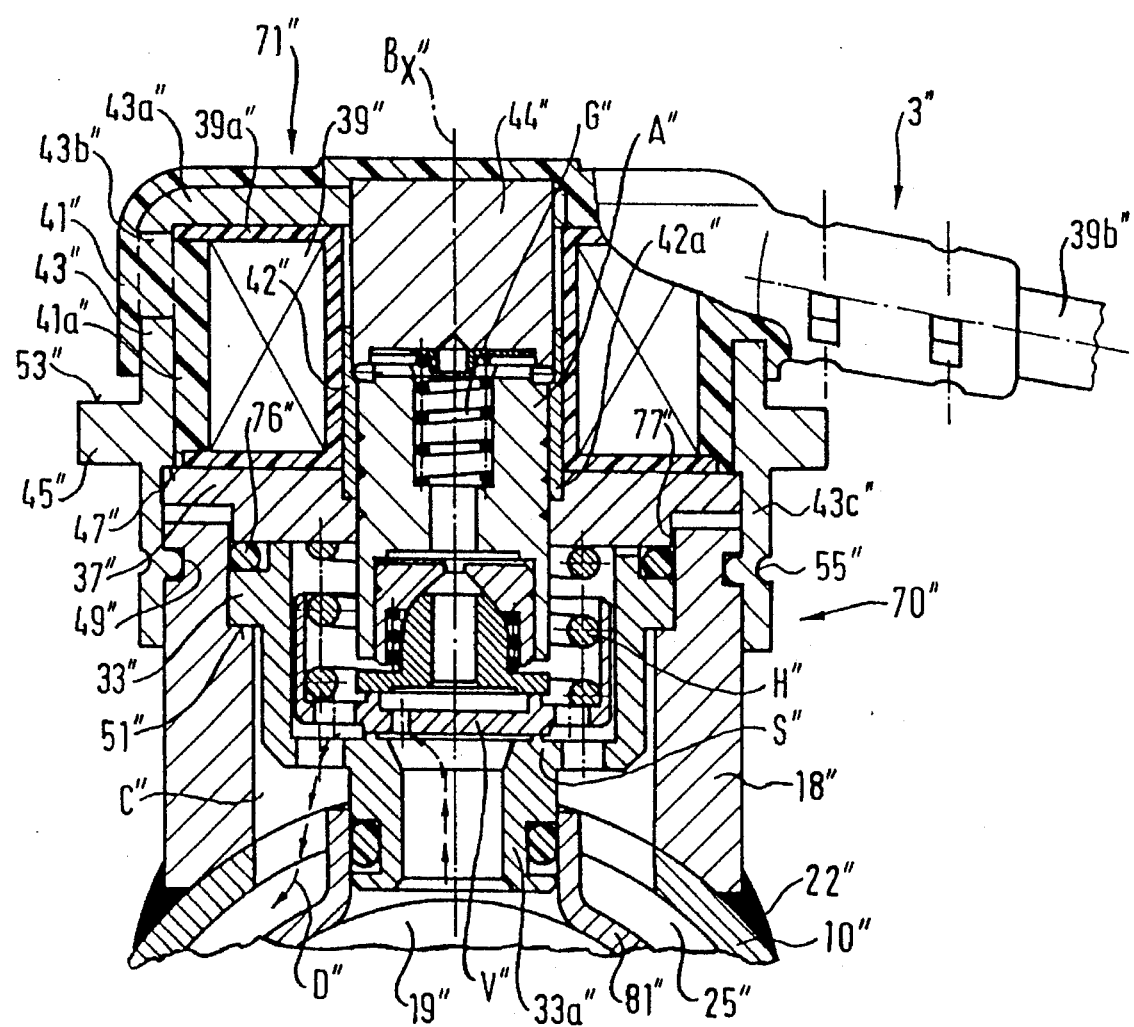

FIG. 11 shows a complete oscillation damper, shock absorber or vibration damper 1", which could incorporate the embodiments of present invention, a detailed illustration of the valve unit 3" being omitted for the sake of clarity. The embodiment shown in FIGS. 11 and 12 is not to be considered as restrictive. The oscillation damper 1" consists essentially of a pressure pipe 5" in which a piston 7" on a piston rod 9" divides a working space 11" into an upper or piston-rod-side working chamber 11b". A bottom valve unit 15" closes the pressure pipe 5" at the lower end thereof. A fluid path 19" is formed between the pressure pipe 5" and an intermediate pipe 81" said intermediate pipe 81" being arranged concentrically with respect to the pressure pipe 5". A connecting orifice 21" in the pressure pipe 5" connects the upper working chamber 11a" with the fluid path 19". A compensating chamber 25" is confined between the intermediate pipe 81" and a portion of the pressure pipe 5", on the one hand, and the container tube 10" on the other hand. This compensating chamber 25" is axially limited by a base member 12" and a piston rod guiding and sealing unit 83'. The working space 11" is separated by the piston 7" into the upper working chamber 11a" and the lower working chamber 11b". Both the upper and the lower working chamber are filled with a liquid. The compensating chamber 25" is also filled with damping liquid up to the level L" and contains a possibly pressurized gas above the level L". The bottom valve unit 15" provides communication between the working chamber 11b" and the compensating chamber 25". The piston 7" provides communication between the lower working chamber 11b" and the upper working chamber 11a". According to an illustrative example the oscillation damper works as follows: When the piston rod 9" moves upwards, a high flow resistance occurs across the piston 7" and a high pressure is generated in the upper working chamber 11a". Liquid from the upper working chamber 11a" flows through said high flow resistance into the lower working chamber 11b". As the piston rod 9" moves outward of the working space 11", the available volume within the working space 11" is increased. Therefore, liquid can flow from the compensating chamber 25" through the bottom valve unit 15" into the lower working chamber 11b". The flow resistance through the bottom valve unit 15" is small in this phase of operation. The movement of the piston rod 9" with respect to the pressure pipe 5" is damped.

On inward movement of the piston rod 9" fluid flows from the lower working chamber 11b" through the piston 7" into the upper working chamber 11a". The flow resistance across the piston 7" is relatively small and the flow resistance across the bottom valve unit 15" is relatively large. Therefore, a considerable pressure exists even within the upper working chamber 11a". The volume within the working space 11" is reduced by the piston rod 9' entering into the working space 11". Thus, damping liquid must flow from the lower working chamber 11b" through the bottom valve unit 15" into the compensating chamber 25". In this phase of operation the flow resistance through the bottom valve unit 15" is high such that a high pressure occurs within the lower working chamber 11b" and also within the upper working chamber 11a".

By the connecting orifice 21" and the fluid path 19" the upper working chamber 11a" is connected with the compensating chamber 25" via the valve unit 3". As long as the valve unit 3" is closed, the bypass established by the connecting orifice 21", the fluid path 19" and the valve unit 3" is also closed. This is the hardest mode of operation of the oscillation damper. When, however, the valve unit 3" is more or less opened, the bypass is also open. As a result thereof the following behavior exists: On upward movement of the piston rod 9" liquid can flow from the highly pressurized upper working chamber 11a" not only across the piston 7" providing a high flow resistance but also from the working chamber 11a" through the bypass 21", 19", 3" to the compensating chamber 25". Such, the damping force is reduced.

When the piston rod 9" moves downwards, there exists again a high pressure within the upper working chamber 11a", as described above. Therefore, damping liquid can flow from the upper working chamber 11a" through the bypass 21", 19", 3" to the compensating chamber 25". This means that the damping liquid which must be expelled from the working space 11" as a result of the reduced volume therein does not only escape through the bottom valve unit 15" to the compensating chamber 25" but can also partially escape through the bypass 21", 19", 3" to the compensating chamber 25". Such, the damping force is again reduced by the open bypass 21", 19", 3". It is to be noted that the direction of flow of the damping liquid through the bypass 21", 19", 3" is the same, both on upward movement and downward movement of the piston rod 9" with respect to the pressure pipe 5". By increasing the flow resistance through the valve unit 3" the damping force can be increased both for upward and downward movement of the piston rod 9", and by increasingly opening the valve unit 3" the damping force can be reduced both for upward movement and downward movement of the piston rod 9". It is possible to selectively open and close the valve unit or to continuously vary the flow resistance through the valve unit 3".

In FIG. 12 one can again see the fluid path 19" and the compensating chamber 25", which are interconnectable through the valve unit 3". The fluid path 19" is connected to the upper working chamber 11a". The flow direction from the fluid path 19" to the compensating chamber 25" across the valve unit 3" is indicated by the dotted line D" provided with arrows indicating the flow direction both for inward movement and outward movement of the piston rod 9" with respect to the pressure pipe 5". One can see in FIG. 12 a valve member v" which can be lifted with respect to a valve seat S", such as to open the flow path D" from the fluid path 19" to the compensating chamber 25". Generally, it is sufficient to say that the valve member V" is urged downward in the closing sense towards the valve seat S" by a helical compression spring H" and that the valve member V" can be lifted in response to upward movement of an electromagnetic armature member A". This armature member A" is biased in downward direction by a helical compression spring G" and can be lifted by energization of a magnetic coil 39" which is energized through a current supply cable 39b".

The valve unit 3" comprises a housing 70". This housing 70" is composed by the side tube 18' and a cover unit 71". The side tube 18" is welded at 22" to the container tube 10". The cover unit 71" is fastened to the side tube 18".

A pot-shaped valve components housing 33" is inserted into the side tube 18" and is axially located on a shoulder face 51" inside the side tube 18". Various valve components are located inside the valve components housing 33". The lower end of the valve components housing 33" is shaped as a tube section 33a", which provides the valve seat S" and is sealingly connected to the fluid path 19".

The cover unit 71" comprises an iron jacket 43" integral with an iron end wall 43a". The iron jacket 43" and the iron end wall 43a" are coated with a plastic layer 41". An annular electromagnetic coil 39" is housed within the iron jacket 43". This electromagnetic coil 39" is carried by a coil carrier 39a", which is annular about the axis $B_x$" and is open in radial outward direction. The coil carrier 39a" is closed in radially outward direction by a plastics material 41a" integral with the plastic layer 41" through openings 43b" of the iron jacket 43". The plastics layer 41" and the plastics material 41a" are integrally moulded by injection moulding with the iron jacket 43", the iron end wall 43a" integral therewith and the electromagnetic coil 39" carrier 39a" being inserted into the injection mould.

A ferromagnetic core 44" is inserted into a central opening of the iron end wall 43a" and covered by the plastics layer 41". An iron flange portion 37" is provided at the lower side of the electromagnetic coil 38" and is engaged with a shoulder face 47" of the iron jacket 43". A pole tube 42" is seated within an annular recess 42a" of the iron flange portion 37". The pole tube 42" is sealingly connected to the iron flange portion 37" and to the ferromagnetic core 44". The armature A" is guided within the pole tube 42". The pole tube 42" is made of nonmagnetic material so that the magnetic field lines are deflected by the lower end of the pole tube 42". The iron jacket 43", the iron end wall 43a", the ferromagnetic core 44" and the iron flange portion 37"

form a ferromagnetic core arrangement which toroidally surrounds the electromagnetic coil 39".

The cover unit 71" is fastened to the side tube 18" by a sleeve-shaped extension 43c" of the iron jacket 43". This sleeve-shaped extension 43c" axially overlaps the side tube 18" by a circumferential bead 55" being embossed into a circumferential groove 49" on the radially outer face of the side tube 18". The iron jacket 43" is provided with a pretensioning flange 45". The pretensioning flange 45" offers a pretension face 53". The cover unit 71" can be pretensioned in downward direction as shown in FIG. 17 toward the container tube 10" by a pretensioning tool engaging the container tube 10", on the one hand, and the pretensioning face 53", on the other hand. Such, the iron flange portion 37" is pressed against the upper end of the valve components housing 33", the valve components housing 33" is engaged with the shoulder face 51" of the side tube 18", and the iron flange portion 37" is engaged with the shoulder face 47" of the iron jacket 43". The helical compression spring H" is compressed between the iron flange portion 37" and the valve member V", which is seated on the valve seat S".

While maintaining this pretension of the cover unit 71" against the side tube 18", the bead 55" is rolled or caulked into the circumferential groove 49" of the side tube 18" so that after removing the pretensioning tool an internal pretension is maintained. A sealing ring 76" is, therefore, maintained in sealing engagement with the valve components housing 33", the iron flange portion 37" and the side tube 18". Such, the compartment C" confined by the side tube 18" and the cover unit 71" is sealed against atmosphere. All components of the valve unit 3" are positioned with respect to each other, and the helical compression spring H" as well as the helical compression spring G" and further springs are biased to the desired degree.

It is to be noted that the upper end of the side tube 18" is radially engaged at 77" with the iron flange portion 37" such that when rolling or caulking the bead 55" into the groove 49", no deformation of the side tube 18" and of the iron jacket 43" can occur.

The electromagnetic coil 39" is completely separated from the liquid within the compartment C" by the iron flange portion 37". The pretension during connecting the cover unit 71" and the side tube 18" is selected such that no play can occur.

It should be understood that the various components described and referenced hereinabove with reference to FIGS. 5–10, as well as FIGS. 11 and 12, may essentially be considered to be interchangeable with similar components described and referenced hereinabove with relation to FIGS. 1–4.

One feature of the invention resides broadly in the check valve device between two segments of a fluid connection, which connects two fluid chambers of a shock absorber with one another, whereby the check valve device with at least one check valve which separates a high-pressure segment and a low-pressure segment and has a checking body, can be adjusted between a closed and an open position by means of an external control via a magnet armature and a magnetic winding which is protected by means of a separator plate from the check valve, whereby a first side of the check valve pressurized by the high-pressure segment can be elastically pressed against a check valve seat which is a component of a pot-shaped insert, by means of a compression spring, also that a second side of the check valve body at some distance from this first side and adjacent to a control chamber is pressurized by the fluid pressure in this chamber, also that the control chamber is connected by means of a throttle section which bypasses the check valve body, also that the control chamber is connected by means of a control chamber discharge to the low-pressure segment, whereby there is a control chamber discharge valve with a control chamber discharge valve seat in the control chamber discharge, whereby the control chamber valve seat is configured on a supplemental discharge valve body, which together with a supplemental discharge valve seat on the check valve body forms a supplemental control chamber discharge of the control chamber, and that between the control chamber discharge valve body and the supplemental discharge valve body there is a coil compression spring which applies a prestress to the control chamber discharge valve body in the direction of lifting it from the control chamber discharge valve seat of the supplemental discharge valve body, characterized by the fact that the maximum magnet armature stroke length (hs) is greater than the maximum check body lifting stroke length (a), so that when there is a maximum magnet armature lifting stroke, the supplemental control chamber discharge 47b between the control chamber discharge valve body 45 and the supplemental discharge valve body 47 is completely open.

Another feature of the invention resides broadly in the check valve characterized by the fact that the control chamber discharge 37b has a cross section which is sized so that it makes possible an unthrottled discharge from the control chamber 50.

Yet another feature of the invention resides broadly in the check valve characterized by the fact that a stop ring 59a/b inside the check valve 27 restricts the lifting stroke of the checking body (a).

Still another feature of the invention resides broadly in the check valve characterized by the fact that the stop ring is designed as a thrust collar 59a which is braced between the pot-shaped insert 51 and the separator plate 39.

Another feature of the invention resides broadly in the check valve characterized by the fact that the check valve body 33 has a ring wall, the height of which is designed so that when the maximum check valve body stroke position is reached, the ring wall comes into contact with the separator plate 39.

Yet another feature of the invention resides broadly in the check valve characterized by the fact that the compression spring 37 has a smaller spring range than the magnet armature stroke length (hs).

Examples of check valve arrangements, and components associated therewith, which may be utilized in accordance with the embodiments of the present invention, may be found in the following U.S. Pat. No. 5,078,240, which issued to Ackermann et al. on Jan. 7, 1992; No. 4,482,036, which issued to Wossner et al. on Nov. 13, 1984; No. 4,287,970, which issued to Eusemann et al. on Sep. 8, 1981; and No. 4,105,041, which issued to Axthammer on Aug. 8, 1978.

Examples of electromagnetic valve arrangements with armatures, and associated components, which may be utilized in accordance with the embodiments of the present invention, may be found in the following U.S. Pat. No. 5,265,703, which issued to Ackermann on Nov. 30, 1993; No. 5,180,039, which issued to Axthammer et al. on Jan. 19, 1993; No. 4,899,996, which issued to Maassen et al. on Feb. 13, 1990; No. 4,850,460, which issued to Knecht et al. on Jul. 25, 1989; and No. 4,785,920, which issued to Knecht et al. on Nov. 22, 1988.

Examples of shock absorbers, and components associated therewith, which may be utilized in accordance with the embodiments of the present invention, may be found in the U.S. Patents listed above.

The corresponding foreign patent publication applications, namely, Federal Republic of Germany Patent Application No. P 43 14 519.1, filed on May 3, 1993, having inventors Günther Handke, Otto Samonil and Andreas Zietsch, and DE-OS P 43 14 519.1 and DE-PS P 43 14 519.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The following other foreign patent publication applications are also hereby incorporated by reference as if set forth in their entirety herein: Federal Republic of Germany Patent Application No. P 42 40 837.7, filed on Dec. 4, 1992, having inventor Günther Handke, as well as DE-OS P 42 40 837.7 and DE-PS P 42 40 837.7, as well as their published equivalents, and other equivalents or corresponding applications, if any, in corresponding cases in the Federal Republic of Germany and elsewhere; and Federal Republic of Germany Patent Application No. P 43 08 328.5, filed on Mar. 16, 1993, and No. P 43 31 584.4, filed on Sep. 17, 1993, both having inventors Günther Handke, Lars Rossberg and Andreas Zietsch, as well as DE-OS P 43 08 328.5, DE-PS P 43 08 328.5, DE-OS P 43 31 584.4 and DE-PS P 43 31 584.4, as well as their published equivalents, and other equivalents or corresponding applications, if any, in corresponding cases in the Federal Republic of Germany and elsewhere.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber comprising:
   a cylinder defining a chamber therein, said cylinder containing a damping fluid;
   a piston rod sealingly projecting into said cylinder and being axially displaceable with respect to said cylinder;
   a piston being attached to said piston rod, said piston being slidably disposed within said cylinder to sealingly divide said chamber into first and second chambers;
   means for permitting fluid communication between said first and second chambers;
   said means for permitting fluid communication comprising check valve means, said check valve means having first aperture means and second aperture means, said check valve means being configured for transmitting fluid between said first aperture means and said second aperture means;
   said check valve means comprising:
      an element comprising a first body portion and a second body portion;
      spring means for biasing said first body portion and said second body portion apart from one another;
      a seat;
      said element being selectively disposable against said seat;
      means for permitting displacement of said element away from said seat to promote fluid communication between said first aperture means and said second aperture means;
      said means for permitting displacement of said element away from said seat comprising:
         armature means; and
         electromagnetic means for activating said armature means to permit displacement of said element away from said seat;
      said means for permitting displacement of said element away from said seat permitting said first body portion and said second body portion to move with respect to one another upon action of said biasing means;
   means for maintaining separation of at least a portion of said first body portion and at least a portion of said second body portion from one another, upon displacement of said element away from said seat;
   said means for maintaining separation comprising:
      a first mechanical stop for limiting the displacement of said first body portion, upon displacement of said element away from said seat, to a first maximum displacement;
      a second mechanical stop for limiting the displacement of said second body portion, upon displacement of said element away from said seat, to a second maximum displacement; and
      said first and second mechanical stops being configured such that said first maximum displacement is greater than said second maximum displacement.

2. The shock absorber according to claim 1, wherein said first body portion is rigidly connected to said armature means so as to move with said armature means.

3. The shock absorber according to claim 2, wherein said check valve means further comprises:
   a check valve plate, said check valve plate comprising said seat against which element is selectively disposable;
   an additional seat;
   said check valve plate being selectively disposable against said additional seat; and
   additional spring means for biasing said check valve plate against said additional seat.

4. The shock absorber according to claim 3, wherein:
   said check valve plate is positionable between a first, completely closed position and a second, completely open position;
   said check valve plate being disposed against said additional seat in said first, completely closed position;
   said check valve plate being disposed against said second mechanical stop in said second, completely open position; and
   said check valve plate being configured to traverse said second maximum displacement between said first position and said second position, to thereby limit the displacement of said second body portion to said second maximum displacement.

5. The shock absorber according to claim 4, wherein:
   said armature is positionable between a first, completely closed position and a second, completely open position;
   said first body portion and said second body portion defining a supplemental discharge passage therebetween when said first body portion and said second body portion are separated, to permit supplemental fluid communication between said first aperture means and said second aperture means during fluid communication between said first aperature means and said second aperture means;

said armature means being disposed maximally towards said second body portion in said first, completely closed position, such that said first body portion and said second body portion are in direct contact with one another in said first, completely closed position of said armature means, to close said supplemental discharge passage and prevent fluid communication through said supplemental discharge passage;

said armature means being disposed against said first mechanical stop in said second, completely open position; and said armature means being configured to traverse said first maximum displacement between said first and second positions of said armature means, to thereby limit the displacement of said first body portion to said first maximum displacement.

6. The shock absorber according to claim 5, further comprising;

further spring means for biasing said armature means towards said first, completely closed position;

a control chamber being defined through said first body portion, said second body portion and said armature;

said control chamber being in continual fluid communication with said first aperture means;

said supplemental discharge passage being configured for providing fluid communication between said control chamber and said second aperture means;

said supplemental discharge passage having a cross-section to permit unthrottled flow of damping fluid from said control chamber to said second aperture means;

said second body portion being displaceable away from said seat to define a main flow passage, said main flow passage being configured for providing fluid communication between said first aperture means and said second aperture means;

said check valve plate being displaceable away from said additional seat to provide additional fluid communication between said first aperature means and said second aperture means;

said check valve means having a longitudinal axis;

cup means for containing said check valve plate;

said cup means having a cylindrical wall portion disposed parallel to said longitudinal axis;

said check valve plate having a cylindrical wall portion disposed parallel to said longitudinal axis;

said cylindrical wall portion of said cup means surrounding said cylindrical wall portion of said check valve plate;

a separator plate being disposed between said electromagnetic means and said cup means;

said electromagnetic means, said separator plate and said cup means being rigidly disposed with respect to one another;

said electromagnetic means comprising a ring magnet;

said armature means, said first body portion, said second body portion, said spring means, said additional spring means, said further spring means, said check valve plate, said ring magnet, said separator plate, and said cup means all being concentric with respect to said longitudinal axis;

said cylindrical wall portion of said cup means having an interior portion and an end portion, said end portion being oriented perpendicular to said longitudinal axis;

said second mechanical stop comprising one of:
a stop ring being disposed concentrically with respect to said longitudinal axis, said stop ring being rigidly disposed against said separator plate, said stop ring comprising one of:
a thrust collar having a portion being rigidly fixed in place between said end portion of said cup means and said separator plate; and
a clamping ring being pressure-fitted to the interior surface of said cylindrical wall portion of said cup means, wherein said end portion of said cup means is disposed against said separator plate; and
said separator plate, wherein said cylindrical wall portion of said check valve plate is disposed against said separator plate in said second, completely open position of said check valve plate;

said additional spring having a spring range defined parallel to said longitudinal axis;

said spring range of said additional spring being less than first maximum displacement;

said first body portion having an interior surface;

said second body portion having an exterior surface;

said interior surface of said first body portion having a generally conical portion;

said exterior surface of said second body portion having a generally conical portion;

said generally conical portion of said interior surface of said first body portion being configured to interface with said generally conical portion of said exterior surface of said second body portion;

said supplemental discharge passage is defined at least partly between said generally conical portion of said interior surface of said first body portion and said generally conical portion of said exterior surface of said second body portion;

said spring means having a first portion and a second portion;

said first portion of said spring means having means for being fixedly retained on said first body portion;

said second portion of said spring means having means for being fixedly retained on said second body portion;

first means, for fixedly retaining said first portion of said spring means on said first body portion;

second means, for fixedly retaining said second portion of said spring means on said second body portion;

said first retaining means and said second retaining means being configured to hold said first body portion, said second body portion and said spring means together as a modular, interchangeable unit during assembly of said shock absorber said first portion of said spring means having an inner diameter portion and an outer diameter portion, and said second portion of said spring means has an inner diameter portion and an outer diameter portion;

one of said inner diameter portion and said outer diameter portion of said first portion of said spring means being fixedly retained on said first body portion;

one of said inner diameter portion and said outer diameter portion of said second portion of said spring means being fixedly retained on said second body portion;

said first retaining means comprising one of:
means for providing a form fit between said first portion of said spring means and said first body portion to fixedly retain said first portion of said spring means on said first body portion; and means for providing a force fit between said first portion of said spring means and said first body portion to fixedly retain said first portion of said spring means on said first body portion; and second retaining means comprising one of:
means for providing a form fit between said second portion of said spring means and said second body portion to fixedly retain said second portion of said spring means on said second body portion; and
means for providing a force fit between said second portion of said spring means and said second body portion to fixedly retain said second portion of said spring means on said second body portion.

7. A shock absorber comprising:
a cylinder defining a chamber therein, said cylinder containing a damping fluid;
a piston rod sealingly projecting into said cylinder and being axially displaceable with respect to said cylinder;
a piston being attached to said piston rod, said piston being slidably disposed within said cylinder to sealingly divide said chamber into first and second chambers;
means for permitting fluid communication between said first and second chambers;
said means for permitting fluid communication comprising check valve means, said check valve means having first aperture means and second aperture means, said check valve means being configured for transmitting fluid between said first aperture means and said second aperture means;
said check valve means comprising:
an element comprising a first body portion and a second body portion;
means for biasing said first body portion and said second body portion apart from one another;
a seat;
said element being selectively disposable against said seat;
means for permitting displacement of said element away from said seat to promote fluid communication between said first aperture means and said second aperture means; and
said means for permitting displacement of said element away from said seat permitting said first body portion and said second body portion to move with respect to one another upon action of said biasing means; and
means for maintaining separation of at least a portion of said first body portion and at least a portion of said second body portion from one another, upon displacement of said element away from said seat.

8. The shock absorber according to claim 7, wherein said means for maintaining separation comprises:
a first mechanical stop for limiting the displacement of said first body portion, upon displacement of said element away from said seat, to a first maximum displacement;
a second mechanical stop for limiting the displacement of said second body portion, upon displacement of said element away from said seat, to a second maximum displacement; and
said first and second mechanical stops being configured such that said first maximum displacement is greater than said second maximum displacement.

9. The shock absorber according to claim 8, wherein said biasing means comprises spring means.

10. The shock absorber according to claim 9, wherein:
said means for permitting displacement of said element away from said seat comprises:
armature means; and
electromagnetic means for activating said armature means to permit displacement of said element away from said seat.

11. The shock absorber according to claim 10, wherein said first body portion is rigidly connected to said armature means so as to move with said armature means.

12. The shock absorber according to claim 11, wherein said check valve means further comprises:
a check valve plate, said check valve plate comprising said seat against which element is selectively disposable;
an additional seat;
said check valve plate being selectively disposable against said additional seat; and
additional spring means for biasing said check valve plate against said additional seat.

13. The shock absorber according to claim 12, wherein:
said check valve plate is positionable between a first, completely closed position and a second, completely open position;
said check valve plate being disposed against said additional seat in said first, completely closed position;
said check valve plate being disposed against said second mechanical stop in said second, completely open position; and
said check valve plate being configured to traverse said second maximum displacement between said first position and said second position, to thereby limit the displacement of said second body portion to said second maximum displacement.

14. The shock absorber according to claim 13, further comprising:
said armature being positionable between a first, completely closed position and a second, completely open position;
said first body portion and said second body portion defining a supplemental discharge passage therebetween when said first body portion and said second body portion are separated, to permit supplemental fluid communication between said first aperture means and said second aperture means during fluid communication between said first aperature means and said second aperture means;
said armature means being disposed maximally towards said second body portion in said first, completely closed position, such that said first body portion and said second body portion are in direct contact with one another in said first, completely closed position of said armature means, to close said supplemental discharge passage and prevent fluid communication through said supplemental discharge passage;
said armature means being disposed against said first mechanical stop in said second, completely open position;
said armature means being configured to traverse said first maximum displacement between said first and second positions of said armature means, to thereby limit the displacement of said first body portion to said first maximum displacement;
further spring means for biasing said armature means towards said first, completely closed position;

a control chamber being defined through said first body portion, said second body portion and said armature;

said control chamber being in continual fluid communication with said first aperture means;

said supplemental discharge passage being configured for providing fluid communication between said control chamber and said second aperture means;

said supplemental discharge passage having a cross-section to permit unthrottled flow of damping fluid from said control chamber to said second aperture means;

said second body portion being displaceable away from said seat to define a main flow passage, said main flow passage being configured for providing fluid communication between said first aperture means and said second aperture means;

said check valve plate being displaceable away from said additional seat to provide additional fluid communication between said first aperature means and said second aperture means;

said check valve means having a longitudinal axis;

cup means for containing said check valve plate;

said cup means having a cylindrical wall portion disposed parallel to said longitudinal axis;

said check valve plate having a cylindrical wall portion disposed parallel to said longitudinal axis;

said cylindrical wall portion of said cup means surrounding said cylindrical wall portion of said check valve plate;

a separator plate being disposed between said electromagnetic means and said cup means;

said electromagnetic means, said separator plate and said cup means being rigidly disposed with respect to one another;

said electromagnetic means comprising a ring magnet;

said armature means, said first body portion, said second body portion, said spring means, said additional spring means, said further spring means, said check valve plate, said ring magnet, said separator plate, and said cup means all being concentric with respect to said longitudinal axis;

said cylindrical wall portion of said cup means having an interior portion and an end portion, said end portion being oriented perpendicular to said longitudinal axis;

said second mechanical stop comprising one of:
  a stop ring being disposed concentrically with respect to said longitudinal axis, said stop ring being rigidly disposed against said separator plate, said stop ring comprising one of:
    a thrust collar having a portion being rigidly fixed in place between said end portion of said cup means and said separator plate; and
    a clamping ring being pressure-fitted to the interior surface of said cylindrical wall portion of said cup means, wherein said end portion of said cup means is disposed against said separator plate; and
  said separator plate, wherein said cylindrical wall portion of said check valve plate is disposed against said separator plate in said second, completely open position of said check valve plate;

said additional spring having a spring range defined parallel to said longitudinal axis;

said spring range of said additional spring being less than first maximum displacement;

said first body portion having an interior surface;

said second body portion having an exterior surface;

said interior surface of said first body portion having a generally conical portion;

said exterior surface of said second body portion having a generally conical portion;

said generally conical portion of said interior surface of said first body portion being configured to interface with said generally conical portion of said exterior surface of said second body portion;

said supplemental discharge passage is defined at least partly between said generally conical portion of said interior surface of said first body portion and said generally conical portion of said exterior surface of said second body portion;

said spring means having a first portion and a second portion;

said first portion of said spring means having means for being fixedly retained on said first body portion;

said second portion of said spring means having means for being fixedly retained on said second body portion;

first means, for fixedly retaining said first portion of said spring means on said first body portion;

second means, for fixedly retaining said second portion of said spring means on said second body portion;

said first retaining means and said second retaining means being configured to hold said first body portion, said second body portion and said spring means together as a modular, interchangeable unit during assembly of said shock absorber said first portion of said spring means having an inner diameter portion and an outer diameter portion, and said second portion of said spring means has an inner diameter portion and an outer diameter portion;

one of said inner diameter portion and said outer diameter portion of said first portion of said spring means being fixedly retained on said first body portion;

one of said inner diameter portion and said outer diameter portion of said second portion of said spring means being fixedly retained on said second body portion;

said first retaining means comprising one of:
  means for providing a form fit between said first portion of said spring means and said first body portion to fixedly retain said first portion of said spring means on said first body portion; and
  means for providing a force fit between said first portion of said spring means and said first body portion to fixedly retain said first portion of said spring means on said first body portion; and said second retaining means comprising one of:
  means for providing a form fit between said second portion of said spring means and said second body portion to fixedly retain said second portion of said spring means on said second body portion; and
  means for providing a force fit between said second portion of said spring means and said second body portion to fixedly retain said second portion of said spring means on said second body portion.

15. In a shock absorber, which shock absorber comprises: a cylinder defining a chamber therein, the cylinder containing a damping fluid; a piston rod sealingly projecting into the cylinder and being axially displaceable with respect to the cylinder; a piston being attached to the piston rod, the piston being slidably disposed within the cylinder to sealingly divide the chamber into first and second chambers; means for permitting fluid communication between the first and second chambers, check valve means comprising means for permitting fluid communication comprising a check valve;

said check valve having first aperture means and second aperture means, said check valve being configured for transmitting fluid between the first aperture means and the second aperture means;

said check valve further comprising:

an element comprising a first body portion and a second body portion;

spring means for biasing said first body portion and said second body portion apart from one another;

a seat;

said element being selectively disposable against said seat;

means for permitting displacement of said element away from said seat to promote fluid communication between said first aperture means and said second aperture means;

said means for permitting displacement of said element away from said seat comprising:

armature means; and electromagnetic means for activating said armature means to permit displacement of said element away from said seat;

said means for permitting displacement of said element away from said seat permitting said first body portion and said second body portion to move with respect to one another upon action of said biasing means;

means for maintaining separation of at least a portion of said first body portion and at least a portion of said second body portion from one another, upon displacement of said element away from said seat;

said means for maintaining separation comprising:

a first mechanical stop for limiting the displacement of said first body portion, upon displacement of said element away from said seat, to a first maximum displacement;

a second mechanical stop for limiting the displacement of said second body portion, upon displacement of said element away from said seat, to a second maximum displacement; and said first and second mechanical stops being configured such that said first maximum displacement is greater than said second maximum displacement.

16. The check valve according to claim 15, wherein said first body portion is rigidly connected to said armature means so as to move with said armature means.

17. The check valve according to claim 16, wherein said check valve further comprises:

a check valve plate, said check valve plate comprising said seat against which element is selectively disposable;

an additional seat;

said check valve plate being selectively disposable against said additional seat; and additional spring means for biasing said check valve plate against said additional seat.

18. The check valve according to claim 17, wherein:

said check valve plate is positionable between a first, completely closed position and a second, completely open position;

said check valve plate being disposed against said additional seat in said first, completely closed position;

said check valve plate being disposed against said second mechanical stop in said second, completely open position; and said check valve plate being configured to traverse said second maximum displacement between said first position and said second position, to thereby limit the displacement of said second body portion to said second maximum displacement.

19. The check valve according to claim 18, wherein:

said armature is positionable between a first, completely closed position and a second, completely open position;

said first body portion and said second body portion defining a supplemental discharge passage therebetween when said first body portion and said second body portion are separated, to permit supplemental fluid communication between said first aperture means and said second aperture means during fluid communication between said first aperature means and said second aperture means;

said armature means being disposed maximally towards said second body portion in said first, completely closed position, such that said first body portion and said second body portion are in direct contact with one another in said first, completely closed position of said armature means, to close said supplemental discharge passage and prevent fluid communication through said supplemental discharge passage;

said armature means being disposed against said first mechanical stop in said second, completely open position; and said armature means being configured to traverse said first maximum displacement between said first and second positions of said armature means, to thereby limit the displacement of said first body portion to said first maximum displacement.

20. The check valve according to claim 19, further comprising;

further spring means for biasing said armature means towards said first, completely closed position;

a control chamber being defined through said first body portion, said second body portion and said armature;

said control chamber being in continual fluid communication with said first aperture means;

said supplemental discharge passage being configured for providing fluid communication between said control chamber and said second aperture means;

said supplemental discharge passage having a cross-section to permit unthrottled flow of damping fluid from said control chamber to said second aperture means;

said second body portion being displaceable away from said seat to define a main flow passage, said main flow passage being configured for providing fluid communication between said first aperture means and said second aperture means;

said check valve plate being displaceable away from said additional seat to provide additional fluid communication between said first aperature means and said second aperture means;

said check valve having a longitudinal axis;

cup means for containing said check valve plate;

said cup means having a cylindrical wall portion disposed parallel to said longitudinal axis;

said check valve plate having a cylindrical wall portion disposed parallel to said longitudinal axis;

said cylindrical wall portion of said cup means surrounding said cylindrical wall portion of said check valve plate;

a separator plate being disposed between said electromagnetic means and said cup means;

said electromagnetic means, said separator plate and said cup means being rigidly disposed with respect to one another;

said electromagnetic means comprising a ring magnet;

said armature means, said first body portion, said second body portion, said spring means, said additional spring means, said further spring means, said check valve plate, said ring magnet, said separator plate, and said cup means all being concentric with respect to said longitudinal axis;

said cylindrical wall portion of said cup means having an interior portion and an end portion, said end portion being oriented perpendicular to said longitudinal axis;

said second mechanical stop comprising one of:
  a stop ring being disposed concentrically with respect to said longitudinal axis, said stop ring being rigidly disposed against said separator plate, said stop ring comprising one of:
    a thrust collar having a portion being rigidly fixed in place between said end portion of said cup means and said separator plate; and
    a clamping ring being pressure-fitted to the interior surface of said cylindrical wall portion of said cup means, wherein said end portion of said cup means is disposed against said separator plate; and
  said separator plate, wherein said cylindrical wall portion of said check valve plate is disposed against said separator plate in said second, completely open position of said check valve plate;

said additional spring having a spring range defined parallel to said longitudinal axis;

said spring range of said additional spring being less than first maximum displacement;

said first body portion having an interior surface;

said second body portion having an exterior surface;

said interior surface of said first body portion having a generally conical portion;

said exterior surface of said second body portion having a generally conical portion;

said generally conical portion of said interior surface of said first body portion being configured to interface with said generally conical portion of said exterior surface of said second body portion;

said supplemental discharge passage is defined at least partly between said generally conical portion of said interior surface of said first body portion and said generally conical portion of said exterior surface of said second body portion;

said spring means having a first portion and a second portion;

said first portion of said spring means having means for being fixedly retained on said first body portion;

said second portion of said spring means having means for being fixedly retained on said second body portion;

first means, for fixedly retaining said first portion of said spring means on said first body portion;

second means, for fixedly retaining said second portion of said spring means on said second body portion;

said first retaining means and said second retaining means being configured to hold said first body portion, said second body portion and said spring means together as a modular, interchangeable unit during assembly of said check valve said first portion of said spring means having an inner diameter portion and an outer diameter portion, and said second portion of said spring means has an inner diameter portion and an outer diameter portion;

one of said inner diameter portion and said outer diameter portion of said first portion of said spring means being fixedly retained on said first body portion;

one of said inner diameter portion and said outer diameter portion of said second portion of said spring means being fixedly retained on said second body portion;

said first retaining means comprising one of:
  means for providing a form fit between said first portion of said spring means and said first body portion to fixedly retain said first portion of said spring means on said first body portion; and
  means for providing a force fit between said first portion of said spring means and said first body portion to fixedly retain said first portion of said spring means on said first body portion; and said second retaining means comprising one of:
  means for providing a form fit between said second portion of said spring means and said second body portion to fixedly retain said second portion of said spring means on said second body portion; and
  means for providing a force fit between said second portion of said spring means and said second body portion to fixedly retain said second portion of said spring means on said second body portion.

* * * * *

UNITED STATES PATENT AND TRADEMARK OFFICE
CERTIFICATE OF CORRECTION

PATENT NO. : 5,518,089
DATED : May 21, 1996
INVENTOR(S) : Günther HANDKE, Otto SAMONIL and Andreas ZIETSCH It is certified that error appears in the above-indentified patent and that said Letters Patent is hereby corrected as shown below:

On the title page, item [75], after 'Zietsch,', delete "Rothlein" and insert --Röthlein--.

In column 19, line 5, Claim 6, before 'second' insert --said--.

Signed and Sealed this

Sixteenth Day of September, 1997

Attest:

BRUCE LEHMAN

Attesting Officer

Commissioner of Patents and Trademarks